United States Patent
Bakshi et al.

(10) Patent No.: US 12,139,442 B2
(45) Date of Patent: Nov. 12, 2024

(54) BIOCHAR PRODUCT, ITS USE IN FERTILIZERS, AND METHODS OF MAKING THE BIOCHAR

(71) Applicant: IOWA STATE UNIVERSITY RESEARCH FOUNDATION, INC., Ames, IA (US)

(72) Inventors: Santanu Bakshi, Ames, IA (US); Robert C. Brown, Ames, IA (US); Ryan G. Smith, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 18/325,442

(22) Filed: May 30, 2023

(65) Prior Publication Data

US 2023/0322638 A1  Oct. 12, 2023

Related U.S. Application Data

(62) Division of application No. 17/336,804, filed on Jun. 2, 2021, now Pat. No. 11,702,374.

(60) Provisional application No. 63/040,222, filed on Jun. 17, 2020.

(51) Int. Cl.
*C05D 9/00* (2006.01)
*C05G 3/80* (2020.01)

(52) U.S. Cl.
CPC ...... *C05D 9/00* (2013.01); *C05G 3/80* (2020.02)

(58) Field of Classification Search
None
See application file for complete search history.

(56) References Cited

U.S. PATENT DOCUMENTS

| | | |
|---|---|---|
| 8,361,186 B1 | 1/2013 | Shearer et al. |
| 2016/0244379 A1 | 8/2016 | Shearer et al. |
| 2018/0119008 A1 | 5/2018 | Liu et al. |

FOREIGN PATENT DOCUMENTS

| | | |
|---|---|---|
| CN | 105670635 A | 6/2016 |
| EP | 3760605 A1 | 1/2021 |

OTHER PUBLICATIONS

"Iowa State Researchers Studying Slow-Release Fertilizer to Feed Crops, Improve Water Quality," ISU News Service (Jun. 17, 2019).
Bakshi et al., "Capture and Release of Orthophosphate by Fe-Modified Biochars: Mechanisms and Environmental Applications," ACS Sustainable Chem. Eng. 9(2):658-668 (2021).
Bakshi et al., "Phosphate Sorption Onto Modified Biochar Surface," US Biochar Initiative Conference (Jul. 1, 2019).
Bakshi et al., "Phosphate Sorption Onto Modified Biochar Surface," Abstract, US Biochar Initiative Conference (2019).
Wu et al., "Phosphorus Retention Using Iron (II/III) Modified Biochar in Saline-alkaline Soils: Adsorption, C,olumn and Field Tests," Environmental Pollution 261:114223 (2020).

*Primary Examiner* — Wayne A Langel
(74) *Attorney, Agent, or Firm* — Troutman Pepper Hamilton Sanders LLP (Rochester)

(57) ABSTRACT

The present application relates to an iron impregnated biochar and its use as a fertilizer. The iron impregnated biochar of the present application has a ratio of iron (III) to iron (II) ranging from 5:1 to 10:1. The biochar may be produced by a method including treating the biomass with an iron (II) ion solution, pyrolyzing the iron (II)-treated biomass in an oxidative environment and recovering the biochar product from the pyrolyzed iron (II)-treated biomass.

18 Claims, 11 Drawing Sheets

BIOCHAR PRODUCT, ITS USE IN FERTILIZERS, AND METHODS OF MAKING THE BIOCHAR

This application is a division of U.S. patent application Ser. No. 17/336,804, filed Jun. 2, 2021, which claims the benefit of U.S. Provisional Patent Application Ser. No. 63/040,222, filed Jun. 17, 2020, both of which are hereby incorporated by reference in their entirety.

This invention was made with government support under Grant No. 2018-10008-28616 awarded by the United States Department of Agriculture National Institute of Food and Agriculture. The government has certain rights in the invention.

FIELD

The present application relates to a biochar product, its use in fertilizers, and methods of making the biochar product.

BACKGROUND

Increases in human population are driving demand for increases in agricultural productivity and increases in fertilizer use. However, the excessive use of fertilizers causes severe damage to water quality (Carpenter et al., "Nonpoint Pollution of Surface Waters with Phosphorus and Nitrogen," *Ecol. Appl.* 8(3):559-568 (1998)). The phosphate ("P") lost from agricultural soils often contributes to eutrophication, which degrades water quality, causes 'dead zones' and threatens ecosystems. Enhanced nutrient management strategies and proper wastewater handling technologies need to be developed to reduce the risk of P contaminating surface and ground water. Several biological, chemical, and physical treatment technologies to capture P and reduce leakage from agricultural soils into waterbodies have been discussed in the literature (Yeoman et al., "The Removal of Phosphorus during Wastewater Treatment: A Review," *Environ. Pollut.* 49:183-233 (1988)). However, these proposed technologies are often expensive to implement.

Biochars have been shown to improve nutrient bioavailability and uptake by plants (Jeffery et al., "A Quantitative Review of the Effects of Biochar Application to Soils on Crop Productivity Using Meta-Analysis," *Agri. Ecosys. Environ.* 144(1):175-187 (2011); Lehmann et al., "Nutrient Availability and Leaching in an Archaeological Anthrosol and a Ferralsol of the Central Amazon Basin: Fertilizer, Manure and Charcoal Amendments," *Plant Soil* 249:343-357 (2003)). The literature on retention of P by biochar is more equivocal; some researchers found the ability of biochar to bind anionic P from aqueous solutions (Takaya et al., "Phosphate and Ammonium Sorption Capacity of Biochar and Hydrochar from Different Wastes," *Chemosphere* 145:518-527 (2016)), but the literature is inconsistent (Yao et al., "Effect of Biochar Amendment on Sorption and Leaching of Nitrate, Ammonium, and Phosphate in a Sandy Soil," *Chemosphere* 89:1467-1471 (2012)). Recent research shows that positive charge sites on biochar surfaces increase with increasing pyrolysis temperature; however, most biochars produced at low and moderate pyrolysis temperatures have only limited anion exchange capacity (Lawrinenko, M. and Laird, D. A., "Anion Exchange Capacity of Biochar," *Green Chem.* 17:4628-4636 (2015)). The results of a recent meta-analysis (Glaser, B. and Lehr, V., "Biochar Effects on Phosphorus Availability in Agricultural Soils: A Meta-Analysis," *Sci. Rep.* 9:9338 (2019)) of biochar on P availability suggest that biochar has the potential to enhance plant-available P and evaluation of P sorption capacity of biochar is critical since P release from biochar does not become a continuous source to water pollution. Biochar surface modification for enhanced P sorption has the potential to expand applications for biochar (Wilfert et al., "The Relevance of Phosphorus and Iron Chemistry to the Recovery of Phosphorus from Wastewater: A Review," *Environ. Sci. Technol.* 49(16):9400-9414 (2015); Baken et al., "Oxidation of Iron Causes Removal of Phosphorus and Arsenic from Streamwater in Groundwater-Fed Lowland Catchments," *Environ. Sci. Technol.* 49(5):2886-2894 (2015)). Chen reported that biochar produced at low temperature (250° C.) from Fe impregnated orange peel powder sorbed P; however, the sorption capacity was low (1.2 mg $g^{-1}$) (Chen et al., "A Novel Magnetic Biochar Efficiently Sorbs Organic Pollutants and Phosphate," *Biores. Technol.* 102(2):716-723 (2011)). In another study (Liu et al., "Removing Phosphorus from Aqueous Solutions by Using Iron-Modified Corn Straw Biochar," *Front. Environ. Sci. Eng.* 9(6):1066-1075 (2015)), ferrous sulfate modified biochar was reported to adsorb P from aqueous solutions (biochar loading rate=10 g $L^{-1}$). Again, the sorption capacity was low (0.56 mg $g^{-1}$) under conditions that simulated P levels found in agricultural runoff. Moreover, no attempt was made to assess the reversibility of P sorption. Most of the techniques used to trap P in the literature are relatively complex, expensive, and not tested for the reversibility of the sorbed P. As an alternative approach, Wilfert and Baken suggested the use of iron (Fe) to remove and recover P and discussed adsorption and desorption mechanisms for P adsorbed on Fe oxides and P (surface complexation through ligand exchange and surface precipitation) (Wilfert et al., "The Relevance of Phosphorus and Iron Chemistry to the Recovery of Phosphorus from Wastewater: A Review," *Environ. Sci. Technol.* 49(16):9400-9414 (2015); Baken et al., "Oxidation of Iron Causes Removal of Phosphorus and Arsenic from Streamwater in Groundwater-Fed Lowland Catchments," *Environ. Sci. Technol.* 49(5):2886-2894 (2015)). Thermal post pyrolysis air oxidation ("PPAO") of biochars is also a promising approach to increase the nanoporosity and concentration of acidic functional groups on biochar surfaces (Xiao, F. and Pignatello, J. J., "Effects of Post-Pyrolysis Air Oxidation of Biomass Chars on Adsorption of Neutral and Ionizable Compounds," *Environ. Sci. Technol.* 50(12):6276-6283 (2016); Suliman et al., "Modification of Biochar Surface by Air Oxidation: Role of Pyrolysis Temperature," *Biomass Bioenergy* 85:1-11 (2016)) due to the increased acidic functional groups, especially carboxyls, on biochar surface as a result of PPAO.

Biomass pretreated with ferrous sulfate ($FeSO_4$), a low-cost byproduct of steel and titanium production, increases pyrolytic sugar yields several fold while preventing the char agglomeration usually associated with acidic pretreatments or washes designed to increase sugar yields (Rollag et al., "Pretreatments for the Continuous Production of Pyrolytic Sugar from Lignocellulosic Biomass," *Chem. Eng. J* 385:123889 (2020)). When conducted under the partial oxidation conditions of autothermal pyrolysis (Polin et al., "Process Intensification of Biomass Fast Pyrolysis Through Autothermal Operation of a Fluidized Bed Reactor," *Appl. Energy* 249:276-285 (2019); Polin et al., "Conventional and Autothermal Pyrolysis of Corn Stover: Overcoming the Processing Challenges of High-Ash Agricultural Residues," *J. Anal. Appl. Pyrolysis* 143:104679 (2019)), the Fe is converted into oxyhydroxides that end up in the biochar co-product. Moreover, the ferrous sulfate remains non-pyrophoric under autothermal pyrolysis condition (Rollag et al., "Pretreatments for the Continuous Production of Pyrolytic Sugar from Lignocellulosic Biomass," *Chem. Eng. J.* 385:123889 (2020)).

The present application is directed to overcoming these and other deficiencies in the art.

SUMMARY

One aspect of the present application relates to an iron impregnated biochar, where the biochar has a ratio of iron (III) to iron (II) ranging from 5:1 to 10:1.

Another aspect of the present application relates to a method of fertilizing plants. The method includes applying the biochar of the present application to plants or soil proximate to plants.

A further aspect of the present application relates to a method of producing a biochar. The method includes providing biomass; treating the biomass with an iron (II) ion solution; pyrolyzing the iron (II)-treated biomass in an oxidative environment; and recovering the biochar product from the pyrolyzed iron (II)-treated biomass.

Biochars have been suggested to have P capture potential from effluent streams and to recycle the captured P to agricultural soils. However, most biochars have low P sorption capacity. The overarching goal of this application was to evaluate the effectiveness of low-cost $FeSO_4$ impregnated biochar ("ISIB") produced by the oxidative pyrolysis of corn stover ("CS") biomass for removal of P ("ortho-P") from P contaminated water ("PCW") and the subsequent P reversibility test. The first objective of this study was to assess the adsorption of P from aqueous solutions on ISIB. The second objective was to determine whether PPAO treatments increase the ability of ISIB to adsorb P from aqueous solutions or not. The third objective was to assess the desorption of P from P loaded ISIB and PPAO-treated ISIB. No prior studies have identified the mechanisms of P adsorption by ISIB. Therefore, the fourth objective was to investigate mechanisms of P adsorption by ISIB and subsequent desorption of P considering the effect of pH, organic compounds, and competitive cations and anions. It was hypothesized that the ISIB is highly effective for the removal of P through surface complexation (ligand exchange reaction between Fe—OH surface groups and negatively charged P ions) from PCW and the removal efficiency increases after PPAO treatment.

Biochar was produced from corn stover biomass pretreated with $FeSO_4$ (ISIB) using autothermal (air-blown) pyrolysis at 500° C. Point of zero charge ($pH_{ZPC}$) shifted from 8.48 to 4.31 indicating that Fe treatment increased dominance of acid functional groups. Batch equilibration isotherm study showed that ISIB had 11-12 times more P sorption capacity (3,763 versus 46,300 mg $kg^{-1}$, and 6,704 versus 48,821 mg $kg^{-1}$ for non-oxidized and oxidized conditions, respectively) while P desorption rate was ~⅓ relative to the control biochar. FIG. 1A shows the formation of the biochar, as well as the sorption and desorption of P. A column leaching study also shows that ISIB was effective for removing P from simulated agricultural effluent. XRD and SEM-EDS analyses showed the P sorption was predominately through inner-sphere surface complexation followed by surface precipitation and that P is preferentially sorbed by hematite ($\alpha$-$Fe_2O_3$) relative to magnetite ($Fe^{III}_2O_3$+$Fe^{II}O$) or maghemite ($\gamma$-$Fe_2O_3$). This application demonstrates that ISIB can be produced by pyrolyzing corn stover with $FeSO_4$, and the resulting ISIB is effective for adsorption and recycling of P. When loaded with P, the ISIB can potentially be used as a slow-release P fertilizer.

BRIEF DESCRIPTION OF THE DRAWINGS

FIG. 1A is a graphic showing the formation of the biochar of the present application and the sorption and desorption of P. FIG. 1B is a plot of the point of zero charge ("ZPC") measurement of the biochars of the present application compared to biochars formed from previously known methods. Error bars represent standard error of mean (n=3). Error bars that are not visible are smaller than the symbol. Conditions: 0.1 M NaCl solution was shaken with biochar for 24 h, adjusted to pH 2-10 range with either 1 M HCl or NaOH, using a solid loading rate 5 g $L^{-1}$.

FIG. 4A is a graph of the CS-control; FIG. 4B is a graph of the CS-control with PPAO; FIG. 4C is a graph of the ISIB; and FIG. 4D is a graph of the ISIB with PPAO. The left side of the bars represent the water desorption and the right side represents the Mehlich-III desorption. The light color indicates the percent remained P and dark color indicates the percent desorbed P. The 'P adsorbed in solid phase' indicates the P adsorption when challenged with up to 400 mg $L^{-1}$ of initial ortho-P concentration and 'P remained in aqueous phase' indicates the solution phase P concentration after equilibration.

DETAILED DESCRIPTION

Figure 1A:
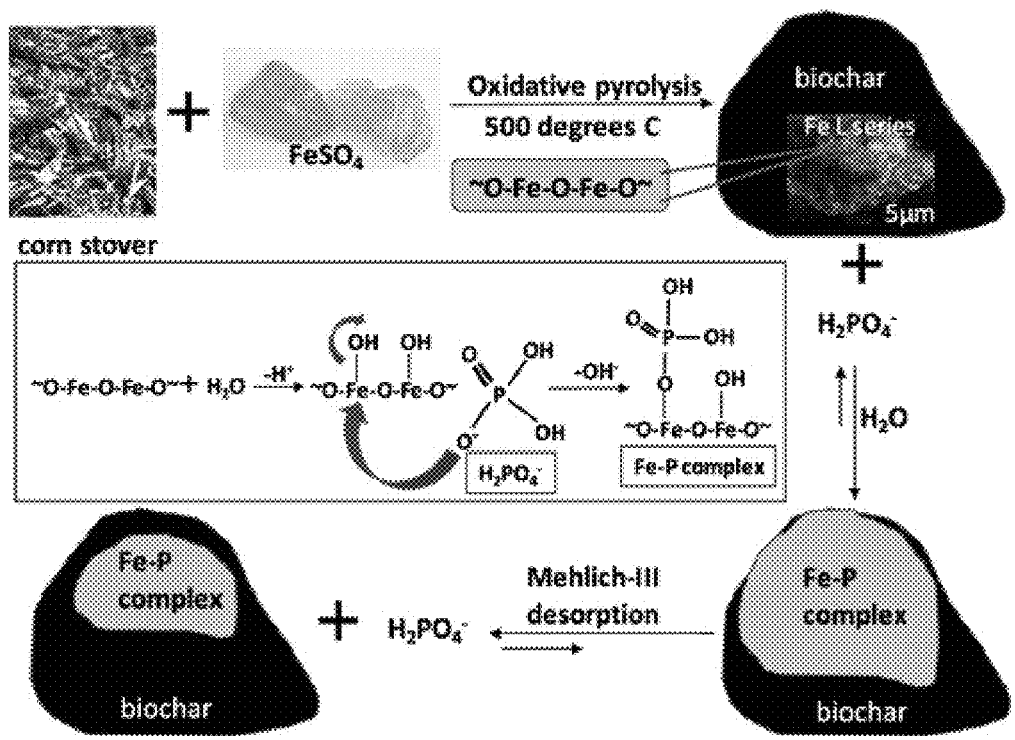
FIGS. 1A-1B show the formation of the biochar of the present application and its comparison to previously known biochars.

One aspect of the present application relates to an iron impregnated biochar, where the biochar has a ratio of iron (III) to iron (II) ranging from 5:1 to 10:1. For example, the ratio of iron (III) to iron (II) may range from 5:1, 6:1, 7:1, 8:1, or 9:1 up to 6:1, 7:1, 8:1, 9:1 or 10:1.

As used herein, the term "biochar" refers to the solid product formed from the pyrolysis of biomass. Biomass refers to any organic source of energy or chemicals that are renewable.

As used herein, the term "pyrolysis" refers to the thermal decomposition of organic materials in an oxygen-poor atmosphere (i.e., less oxygen than required for complete combustion). In general, slow pyrolysis produces large amounts of cokes (which can be used as a solid fuel), whereas fast pyrolysis produces condensable organic compounds (which may be condensed to bio-oil), gas (e.g., CO, $H_2$, $CO_2$, and $CH_4$), and solids (e.g., biochar).

As used herein, the term "bio-oil" refers to a mixture of liquid organic materials obtained by conversion of biomass. Bio-oil may comprise water, light volatiles, and non-volatiles, and significant quantities of oxygen-containing compounds.

Pyrolysis as conventionally defined is the heating of biomass or other carbonaceous solids in the absence of oxygen to produce liquids (bio-oil), solids (biochar), and non-condensable gases (Brown et al., "Biorenewable Resources: Engineering New Products from Agriculture, Second Edition," Wiley Blackwell, Ames, Iowa, 215-26 (2003), which is hereby incorporated by reference in its entirety). Slow pyrolysis, characterized by heating over several minutes or hours, favors dehydration reactions that yield biochar as the primary product. Fast pyrolysis strives to heat biomass to several hundred degrees Centigrade in a few seconds usually with the goal of maximizing bio-oil yield. Fluidized beds are particularly attractive for their ability to transfer heat between granular bed material and biomass particles although other methods including screw augers and entrained flow reactors can also achieve rapid heating of biomass especially if used in conjunction with granular heat carriers.

One traditional example of biomass pyrolysis is the production of charcoal, where the main product of the pyrolysis is char. Other biomass pyrolysis techniques provide a product which, after cooling, includes a substantial proportion of bio-oil liquid. This liquid is typically a dark brown liquid having a heating value that is around one half the heating value of conventional fuel oil. Bio-oil is typically a homogenous hydrophilic mixture of polar organics and water. The biochar of the present application can be formed as a useful side product in the formation of bio-oil.

In some embodiments of the biochar of the present application, the biochar has a ratio of surface area to volume ranging from 300 $m^2 g^{-1}$ to 800 $m^2g^{-1}$. For example, the ratio of surface area to volume may range from about 300 $m^2g^{-1}$, 400 $m^2g^{-1}$, 500 $m^2g^{-1}$, 600 $m^2g^{-1}$ or 700 $m^2g^{-1}$, up to about 400 $m^2g^{-1}$, 500 $m^2g^{-1}$, 600 $m^2g^{-1}$, 700 $m^2g^{-1}$ or 800 $m^2g^{-1}$.

In some embodiments of the present application the biochar is produced from the oxidative pyrolysis of biomass. The biomass may be lignocellulosic biomass, including, but not limited to herbaceous material, agricultural residues, forestry residues, municipal solid wastes, waste paper, pulp, paper mill residues, and combinations thereof. Exemplary biomass useful in the present application include, but are not limited to, corn stover, straw, bagasse, miscanthus, sorghum residue, switch grass, bamboo, water hyacinth, hardwood, hardwood chips, softwood chips, hardwood pulp, softwood pulp, and combinations thereof.

In some embodiments of the biochar of the present application, the biochar formed from the oxidative pyrolysis of biomass has a ratio of hydrogen to carbon content lower than 0.25. For example, the ratio of the hydrogen to carbon may be about 0.25, 0.24, 0.23, 0.22, 0.21, or 0.20.

In some embodiments of the biochar of the present application, the biochar includes an anion adsorbed on the biochar. The anion may be, for example, a phosphate ion. The concentration of the phosphate adhered to the biochar can range from 46 mg/g to 52 mg/g. For example, the concentration of phosphate adhered to the biochar may be about 46 mg/g, 47 mg/g, 48 mg/g, 49 mg/g, 50 mg/g, or 51 mg/g up to about 47 mg/g, 48 mg/g, 49 mg/g, 50 mg/g, 51 mg/g, or 52 mg/g.

Another aspect of the present application relates to a method of fertilizing plants. The method includes applying the biochar of the present application to plants or soil proximate to plants. The application of the biochar to the soil proximate to plants may occur before the plants are added to the soil, or after the plants are added to the soil.

Regardless of the order in which the contacting of the biochar to plant is carried out, the following are all suitable methods in accord with the present application for bringing the biochar fertilizer and plants of choice in contact. Non limiting examples of these methods include broadcast application, drop application, rotary application, liquid or dry in-furrow application, direct incorporation into soils or greenhouse planting mixes, spray application, irrigation, injection, dusting, pelleting, or coating of the plant or the plant seed or the planting medium with the biochar fertilizer. It also is possible to use the powdered biochar for addition to potting mixes or directly in field applications, or as a suspension in a liquid fertilizer using the systems described herein.

The biochar fertilizer of the present application may be applied in the same manner as conventional fertilizers. As known to those skilled in the relevant art, many methods and appliances may be used. The biochar fertilizer may be applied to soil, by spreaders, sprayers, and other mechanized means which may be automated. Such application may be made periodically, such as once per year, or per growing season, or more frequently as desired.

The biochar may be formulated into a fertilizer composition including other materials. The other materials may include a supplemental source of nutrients. These include, for example, soil, water, urea, ammonium nitrate, sources providing nitrogen, phosphorous, potassium, calcium, magnesium, sulfur, and other micronutrients. There are at least sixteen chemical elements known to be useful in a plant's growth and survival. The sixteen chemical elements are divided into two main groups: non-mineral and mineral. The non-mineral nutrients include hydrogen (H), oxygen (O), and carbon (C) and are found in the air and water. The remaining 13 nutrients are minerals, which come from the soil, and are dissolved in water and absorbed through a plant's roots. The mineral nutrients are further divided into two groups: macronutrients and micronutrients. Macronutrients include but are not limited to N, P, S, K, Ca, Mg, Na, and Si. Micronutrients include, but are not limited to, Fe, Mn, Cu, Zn, Mo, B, and Cl. Micronutrients are needed in only very small (i.e., micro) quantities. These nutrients and their benefits to plants would be well known to a person of skill in the art. The biochar of the present application can be blended with other sources of plant nutrients, including potassium, phosphorus, iron, or minor nutrients.

The biochar fertilizer composition may include a source of phosphorus selected from the group consisting of rock phosphate, sodium phosphate, potassium phosphate, bone meal, and combinations thereof.

The biochar fertilizer composition may include a source of potassium selected from the group consisting of potassium chloride, potassium phosphate, potassium sulfate, Jersey green sand, organic sources of potassium, animal manure, and combinations thereof.

The fertilizer may, alternatively, include minor nutrients selected from the group consisting of salts, substances that contain iron, cobalt, manganese, magnesium, copper, calcium, boron, zinc, and combinations thereof. These are readily available from a variety of sources.

A further aspect of the present application relates to a method of producing a biochar. The method includes providing biomass; treating the biomass with an iron (II) ion solution; pyrolyzing the iron (II)-treated biomass in an oxidative environment; and recovering the biochar product from the pyrolyzed iron (II)-treated biomass. Exemplary iron (II) ion solutions include, but are not limited to, solutions of ferrous sulfate, ferrous acetate, ferrous chloride, and combinations thereof.

In some embodiments of the present application, the iron (II) ion solution is an aqueous ferrous sulfate solution. The concentration of the aqueous ferrous sulfate solution may range from 1 wt % to 15 wt % ferrous sulfate. For example, the concentration of the aqueous ferrous sulfate solution may range from about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, or 14 wt % up to about 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %. In some embodiments, the aqueous ferrous sulfate solution has a concentration ranging from 5 wt % to 10 wt % ferrous sulfate.

The treatment of the biomass with the iron (II) ion solution may be carried out at a temperature ranging from 18° C. to 28° C. For example, the temperature may range from about 18° C., 19° C., 20° C., 21° C., 22° C., 23° C., 24° C., 25° C., 26° C., or 27° C. up to about 19° C., 20° C., 21° C., 22° C., 23° C., 24° C., 25° C., 26° C., 27° C. or 28° C.

In some embodiments of the present application, the method of producing a biochar includes subjecting the biochar product to post pyrolysis oxidation to form an oxidized biochar product. Additionally, the method may include adsorbing an anion on the biochar product. The anion may be a phosphate ion. In some embodiments of the method of producing a biochar, the concentration of the phosphate adhered to the biochar is 2 to 3 times greater than that achieved when non-oxidative pyrolysis of biomass is used to form the biochar.

The adsorbing an anion on the biochar product can be carried out by contacting the biochar product with a solution selected from potassium dihydrogen phosphate, potassium hydrogen phosphate, monosodium phosphate, disodium hydrogen phosphate, dicalcium phosphate, monocalcium phosphate, ammonium dihydrogen phosphate, diammonium phosphate, monomagnesium phosphate, dimagnesium phosphate, and combinations thereof. The solutions may range in pH from about 2 up to about 7.2. For example, the solution may have a pH from about 2, 2.5, 3, 3.5, 4, 4.5, 5, 5.5, or 6, up to about 2.5, 3, 3.5, 4, 4.5, 5, 5.5, 6, 6.5, 7, or 7.2. The contracting may be carried out for a period of time ranging from 24 to 48 hours. For example, the contacting may occur for about 24 hours, 26 hours, 28 hours, 30 hours, 32 hours, 34 hours, 36 hours, 38 hours, 40 hours, 42 hours, or 46 hours, up to about 26 hours, 28 hours, 30 hours, 32 hours, 34 hours, 36 hours, 38 hours, 40 hours, 42 hours, 46 hours, or 48 hours.

In some embodiments of the method of producing a biochar, the pyrolyzing is carried out by autothermal fast pyrolysis. The pyrolysis may be carried out at a temperature ranging from 475° C. to 575° C. For example, the temperature may range from about 475° C., 485° C., 495° C., 505° C., 515° C., 525° C., 535° C., 545° C., 555° C., or 565° C. up to about 485° C., 495° C., 505° C., 515° C., 525° C., 535° C., 545° C., 555° C., 565° C., or 575° C. Additionally, the pyrolysis may be carried out for a period of time ranging from 0.1 sec to 120 sec. For example, the time may range from 0.1 sec., 1 sec, 10 sec, 20 sec, 30 sec, 40 sec, 50 sec, 60 sec, 70 sec, 80 sec, 90 sec, 100 sec or 110 sec up to about 1 sec, 10 sec, 20 sec, 30 sec, 40 sec, 50 sec, 60 sec, 70 sec, 80 sec, 90 sec, 100 sec, 110 sec or 120 sec.

The rate and extent of decomposition of the biomass depends on the process parameters of the pyrolysis reactor, e.g. the rate of heating of the biomass, the mode of heating of the biomass and the residence time of the subsequent products.

The pyrolysis of the biomass of the present application may proceed under partial oxidative conditions. As used herein, the term "partial oxidation" relates to a process in which the biomass is supplied with less than the stoichiometric amount of oxygen needed for complete combustion. Partial oxidation may be carried out using any suitable oxygen source, including, but not limited to, pure oxygen, oxygen-enriched air, and air. The partial oxidation may be carried out with air or air/nitrogen mixtures.

The pyrolysis of the iron impregnated biomass of the present application may be done utilizing pyrolysis reactors as known in the art. For example, the pyrolysis may take place in a fluidized bed, rotary-kiln, fixed-bed, batch and semi-batch, or plasma reactor.

Compared to other types of reactors (e.g., fixed bed reactors), fluidized bed reactors have a number of advantages, including the large gas-solid interface area and the nearly isothermal temperature distribution even for highly exothermal reactions. Moreover, fluidized beds have excellent particle mixing and gas-solid contacting. Gas-solid mixing not only enhances mass transfer, but also the heat transfer to internal surfaces (e.g., reactor walls, heat exchanger tubes, etc.) and between particles and the gas.

Exemplary fluidized bed reactors include, but are not limited to, bubbling fluidized bed reactor, circulating fluidized bed reactors, and fast fluidized bed reactors. Exemplary fluidized bed reactors that may be used in the pyrolysis of the biomass of the present application are disclosed in U.S. Pat. No. 10,851,037 to Brown et al.; U.S. Pat. No. 9,011,724 to Tetzlaff; U.S. Pat. No. 9,512,364 to Marker et al.; U.S. Pat. No. 3,853,498 to Bailie; and U.S. Pat. No. 9,464,245 to Gao at el., which are hereby incorporated by reference in their entirety.

Rotary-kiln reactors generally include a cylindrical vessel, inclined slightly horizontally, which is rotated about its axis. The biomass to be processed is fed into the upper end of the cylinder. As the kiln rotates, material gradually moves down towards the lower end, and may undergo a certain amount of stirring and mixing. Hot gases pass along the kiln. The gases may pass along the kiln in the same direction as the process material (concurrent), or alternatively, they may pass along the kiln in the opposite direction (countercurrent). Exemplary rotary-kiln reactors that may be used in the pyrolysis of the biomass of the present application are disclosed in U.S. Pat. No. 10,119,031 to Verbene et al.; U.S. Pat. No. 4,092,098 to Honaker et al.; and U.S. Pat. No. 5,662,052 to McIntosh at el., which are hereby incorporated by reference in their entirety.

Plasma induced pyrolysis in general is initiated by an electric arc discharge, and contains a large number of energetic species like electrons, ions, atoms, free radicals and activated molecules, and can reach temperatures above 3000 K. See Zaho et al., "Biomass Pyrolysis in an Argon/Hydrogen Plasma Reactor," *Eng. Life Sci.* 1:197-199 (2001), which is hereby incorporated by reference in its entirety. When carbonaceous solids (e.g. biomass) are injected into a plasma, they are heated up very rapidly and the volatile matter is released and cracked giving rise to CO, $H_2$, $CH_4$, $C_2H_2$ and other hydrocarbons. Id. Exemplary plasma reactors that may be used in the pyrolysis of the biomass of the present application are disclosed in U.S. Pat. No. 10,702,847 to Spitzi; U.S. Pat. No. 8,388,706 to Ugolin; and U.S. Pat. No. 8,100,996 to Simmons at el., which are hereby incorporated by reference in their entirety.

During fast pyrolysis, dry biomass particles are rapidly heated to high temperatures in a reactor to produce various reaction products, including char, non-condensable gases ("NCGs"), aerosols, and condensable organic compounds (which may be condensed to produce a bio-oil product). NGCs include, but are not limited to, hydrogen, carbon monoxide, carbon dioxide, and light hydrocarbons created during pyrolysis. Aerosols are micron and submicron liquid droplets of organic compounds that either have too high a boiling point to evaporate in the pyrolyzer or have condensed from vapor after leaving the reactor because the gas stream has cooled. Aerosols may comprise carbohydrates, highly substituted phenolic compounds, and lignin oligomers. Condensable organic compounds include, but are not limited to, water and organic compounds (e.g., carboxylic acids, alcohols, esters and phenolic compounds)

There are several different options for achieving heating of the biomass in a fast pyrolysis reactor. For example, ablative pyrolysis requires the biomass particles to be pressed against a heated surface and rapidly moved. This allows the use of relatively large biomass particles. Alternatively, fluid bed and circulating fluid bed pyrolysis reactors transfer heat from a heat source to the biomass particles by a mixture of convention and conduction. Since heat transfer must typically occur quickly, fluid bed pyrolysis reactor require the use of small biomass particles, e.g. not more than 3 mm. A further alternative is vacuum pyrolysis, in which heating rates may be relatively low, but the application of a vacuum quickly extracts the pyrolysis products and thus simulates some effects of fast pyrolysis.

Further, more recent, reviews of biomass pyrolysis have been conducted by A. V. Bridgwater (Bridgewater, "Renewable Fuels and Chemicals by Thermal Processing of Biomass," *Chemical Engineering Journal* 91(2-3) 87-102 (2003); Bridgewater "Biomass Fast Pyrolysis," *Thermal Science* 8(2): 21-49 (2004), which are hereby incorporated by reference in their entirety) in which it is explained that lower process temperatures and longer residence times in the pyrolysis reactor favors the production of char.

Preferences and options for a given aspect, feature, embodiment, or parameter of the technology described herein should, unless the context indicates otherwise, be regarded as having been disclosed in combination with any and all preferences and options for all other aspects, features, embodiments, and parameters of the technology.

The present technology may be further illustrated by reference to the following examples.

EXAMPLES

The examples below are intended to exemplify the practice of embodiments of the disclosure but are by no means intended to limit the scope thereof.

Example 1—Materials and Methods

Materials

All chemicals used in this study were analytical grade and purchased from Fisher Scientific (Pittsburgh, PA) or Sigma-Aldrich (St. Louis, MO). Commercially available ferrous sulfate was supplied by Fisher Scientific (Pittsburgh, PA). X-ray diffraction ("XRD") analysis was used to confirm the presence of ferrous sulfate, a mixture of melanterite ($FeSO_4 \cdot 7H_2O$), and rozenite ($FeSO_4 \cdot 4H_2O$) was found. Water used in this study was 18.2 MΩ milli-Q water. Corn stover used as biomass feedstock in this study was collected from one of the agricultural farms of Iowa State University.

Data Handling

Production of the CS-control and ISIB was done in single batches; however, all chemical analyses and characterizations were done in triplicate. Data sets presented in this study are expressed as arithmetic means of triplicates with standard deviations.

Example 2—Biochar Preparation and Post Pyrolysis Air-Oxidation

Both control (henceforth denoted as 'CS-control') and ISIB were prepared from corn stover biomass through autothermal pyrolysis at 500° C. (Polin et al., "Process Intensification of Biomass Fast Pyrolysis Through Autothermal Operation of a Fluidized Bed Reactor," *Appl. Energy* 249:276-285 (2019), which is hereby incorporated by reference in its entirety). Several bales of corn stover, stored indoors for several months prior to use to allow them to air dry, were milled to 1.59 mm minus particle size using a stationary hammermill (Art's Way, Model 430). To prepare the feedstock for the ISIB, a commercial continuous spray coater/paddle mixer (Marion Mixer CPS 1254) was used to pretreat the milled corn stover biomass with $FeSO_4$. As the corn stover passed through the paddle mixer it was sprayed with a 7.5 wt % solution of $FeSO_4$ at a water-to-biomass ratio of 1:1. The treated biomass was placed in a bucket for 48 h to assure diffusion of the solution into the interior of the biomass before being dried in an oven at 105° C. for 12 hours. Prepared biomass for the CS-control and ISIB was fed from a bin into the fluidized bed pyrolyzer at a rate of 1-1.2 kg $hr^{-1}$ with air at an equivalence ratio around 12% serving as fluidization gas. A pair of gas cyclones was used to separate solid biochar particles from the overall product stream exiting the reactor.

To increase surface area and create new nanopores and micropores, the biochars were subjected to post-pyrolysis air oxidation (Xiao, F. and Pignatello, J. J., "Effects of Post-Pyrolysis Air Oxidation of Biomass Chars on Adsorption of Neutral and Ionizable Compounds," *Environ. Sci. Technol.* 50(12):6276-6283 (2016), which is hereby incorporated by reference in its entirety). In brief, the PPAO was carried out by placing~0.3 g of oven dried biochar in an amber glass vial and heating it in a muffle furnace to 400° C. for 15 mins. Mass loss due to burning part of the biochar was recorded at the end of the PPAO treatment.

Example 3—Batch Sorption and Desorption Isotherm Protocols

Batch equilibration sorption and desorption studies were conducted in aqueous phase to compare P sorption and desorption by ISIB and the CS-control biochar at room temperature. Appropriate volumes of P stock solution (1000 mg/L P as $KH_2PO_4$ adjusted to pH 7.8-8.0 using 0.5 N NaOH solution) and water were added to 0.1 g of solid biochar (solid loading rate was 5 g/L). A range of initial P concentrations was tested (0, 10, 20, 50, 75, 100, 200, 300, and 400 mg/L) to evaluate the effectiveness of the biochars towards P sorption. After shaking in a reciprocating shaker (70 rpm) for 48 h, the solutions were syringe filtered using 0.45 µm membrane. The filtrates were collected in 22 mL plastic screw-cap scintillation vials and stored at 4° C. until P analysis. A blank sorption experiment without biochar was carried out to test for P adsorption onto the plastic vials and filter membranes. The equilibrium pH of the solution was measured after the adsorption experiment with a pH meter. The amount of P adsorbed was calculated by the following equation:

$$P_{adsorbed}(mg/g) = \frac{\{(P_{added,x}) + (P_{control,0})\} - (P_{remaining,x})}{\text{biochar sample weight}} \quad (1)$$

where $P_{added,\,x}$ is the amount of P added to the $x^{th}$ sample (mg), $P_{control,0}$ is the amount of P remaining in solution after equilibration for the control sample to which no P had been added (mg), and $P_{remaining,x}$ is the amount of dissolved P after equilibration for the $x^{th}$ sample (mg). The adsorption isotherms data were fitted to either the Freundlich or Langmuir models.

Phosphorus adsorption of Fe-impregnated biochars produced under nitrogen (non-oxidative) pyrophoric conditions, and autothermal pyrolysis (oxidative conditions) were also compared. These tests were performed similarly to the equilibration sorption and desorption studies.

Desorption experiments were carried out separately from the adsorption experiments. Water and Mehlich-III were used as desorbing agents. The latter desorbing agent, henceforth denoted as 'M-III', consisted of 0.2 N acetic acid, 0.25 N ammonium nitrate, 0.015 N ammonium fluoride, 0.013 N nitric acid, and 0.001 M EDTA (Mehlich, A., "Mehlich 3 Soil Test Extractant: A Modification of Mehlich 2 Extractant," *Comm. Soil Sci. Plant Anal.* 15:1409-1416 (1984), which is hereby incorporated by reference in its entirety). For desorption, P loaded biochars (after the sorption process with 10, 50, 100, 200, and 400 mg/L P solutions for 48 h) were separated from solution using vacuum filtration using a 0.45 µm membrane. After separation, the filter membrane together with biochar was transferred quantitatively into the same vials (after being washed with water) and the vials were shaken for 48 h desorption period with either water or M-III solution. The desorption process with water was performed in triplicate while desorption with M-III solution was performed only once per test condition. The collected supernatant from each desorption step was filtered through a 0.45 µm membrane and saved at 4° C. until P analysis. The blank desorption experiment conducted without biochar indicated negligible P sorption or desorption from the plastic vial and filter membrane.

Example 4—Batch Sorption Kinetic Protocols

A batch adsorption kinetic study was conducted by mixing 0.1 g of the biochar with 20 mL of 400 mg/L P solution at room temperature. The vials were shaken at 70 rpm in a reciprocating shaker for different time intervals-0, 2, 3, 24, and 48 h. At each sampling time, the vial solutions were syringe filtered using 0.45 µm membrane, and filtrates were collected in another 22 mL plastic screw-cap scintillation vials and kept at 4° C. until P analysis. A blank adsorption experiment without biochar was also carried out to test for P adsorption onto the plastic vial and filter membranes. The amount of P adsorbed onto the biochars was calculated using Eq. 1 and the kinetic data were fitted using the pseudo second order kinetic model.

Example 5—Column Leaching Study

Because, the composition of the agricultural effluent varies by region, there is no recommended standard composition for simulating effluent water. For this study, simulated agricultural effluent was prepared by considering EPA recommendation ("Municipal Wastewater, Sewage Sludge, and Agriculture" in *Use of Reclaimed Water and Sludge in Food Crop Production*, National Academies Press, Washington, DC. 17-45 (1996), which is hereby incorporated by reference in its entirety) as follows: $Na^+$ (376 mg $L^{-1}$), $K^+$ (32 mg $L^{-1}$), $Ca^{2+}$ (96 mg $L^{-1}$), $Mg^{2+}$ (48 mg $L^{-1}$), $Cu^{2+}$ (0.05 mg $L^{1}$), $Al^{3+}$ (61 mg $L^{-1}$), $Mn^{2+}$ (0.05 mg $L^{-1}$), $Zn^{2+}$ (0.3 mg $L^{-1}$), Bo (2.6 mg $L^{-1}$), $Ni^{2+}$ (0.4 mg $L^{-1}$), $Cl^-$ (102 mg $L^{-1}$), $SO_4^{2-}$ (82 mg $L^{-1}$), $NO_3^-$—N(26 mg $L^{-1}$), $NH_4^+$—N(29 mg $L^{-1}$), $CO_3^{2-}$ (100 mg $L^{-1}$), and $HCO_3^-$ (100 mg $L^{-1}$). It was prepared by accurately weighing analytical grade chemicals of the above ions into two separate carboys. P was added to achieve 10 and 80 mg $L^{-1}$ (final concentrations were measured as 9.52 and 80.45 mg $L^{-1}$) as $KH_2PO_4$, and the carboys filled with water to the mark of 20 L. The pH of the simulated water was adjusted to ~7.5 with either dilute NaOH or HCl and the dissolved oxygen was removed by purging the carboys with 500 mL $min^{-1}$ constant rate of $N_2$ for 45 min before the column leaching experiment.

Both CS-control and ISIB were studied for their effect on P adsorption in the presence of other competing ions in a sand matrix. The columns were made of PVC measuring 23.4 cm in length and 3.9 cm in diameter with end caps. The material used in columns were fine sand (40-mesh; purchased from Fisher Scientific), Whatman 42 filter paper, and glass beads (particle size>0.5 mm). The bottom of each column was covered with the filter paper to prevent any material loss. Around 2 g of the biochar (particle size<0.5 mm) was added to each column. Briefly, the columns were mounted vertically, and the following sequence of the materials were added from top to bottom: filter paper, 100 g fine sand, filter paper, 2 g biochar, filter paper, 100 g fine sand, filter paper, 180 g glass beads, and filter paper. A total of 14 columns were set up for this study (2 biochars×3 replications×2 simulated agriculture effluents=total 12 columns plus 2 controls one each for the 2 simulated effluents without biochar addition). To control the leachate, a valve was inserted at the bottom of each column. These columns were saturated with water from the bottom to top and then equilibrated for 24 h to pre-condition the columns. The pore volume (~50 mL) was calculated by the difference in weight before and after the columns were water saturated. The columns were flushed with one pore volume of simulated effluent each time with the hydraulic head of 3 cm and the leaching rate of ~1.11 mL min$^{-1}$. All the leachate samples were collected from the bottom of the columns in 60 mL Nalgene bottles and stored at 4° C. until P analysis. Before P analysis, samples were filtered through a 0.45 μm membrane.

Example 6—Characterizations and Analytical Methods

The pH of the solution was measured with a pH meter (Mettler Toledo SevenMulti). Biochar pH was measured using biochar to water mass ratio of 1:15 followed by a 144-h equilibration period (Bakshi et al., "Biochar Amendment Affects Leaching Potential of Copper and Nutrient Release Behavior in Contaminated Sandy Soils," *J. Environ. Qual.* 43:1894-1902 (2014), which is hereby incorporated by reference in its entirety). Elemental C, H, N, and S analyses (total elemental content) were determined in triplicate using an Elementar, vario MICRO cube (Elementar, Hanau, Germany) elemental analyzer after samples were ground in a ball mill. Proximate analysis (moisture, volatile matter, ash content, and fixed C by difference) (ASTM D1762-84, Standard Test Method for Chemical Analysis of Wood Charcoal. ASTM International: Philadelphia, P A. 2007, which is hereby incorporated by reference in its entirety) was done using thermogravimetric analysis (Mettle Toledo TGA/DSC 1 STARe System). The fixed C was calculated by the difference between 100 and the sum of moisture, volatile matter, and ash percentages. The inorganic elemental composition of the biochars was determined by dry ashing the biochar samples at 750° C. for 5 h and then solubilizing the ash in concentrated HNO3 (trace metals grade; purchased from Fisher Scientific) under microwave digestion (USEPA. Method 3052: *Microwave Assisted Acid Digestion of Siliceous and Organically Based Matrices*, USEPA: Cincinnati, OH 45268 (1996), which is hereby incorporated by reference in its entirety). Elemental analysis was done after the final dilution by ICP-OES following USEPA Method 200.7 (USEPA. Method 200.7: *Determination of Metals and Trace Elements in Water and Wastes by Inductively Coupled Plasma-Atomic Emission Spectrometry*, Environmental Monitoring Systems Laboratory, USEPA: Cincinnati, OH 45268 (2007), which is hereby incorporated by reference in its entierty). The point of zero charge (pH$_{ZPC}$) of biochar was determined using the solid addition method as described by Balistrieri and Murray (Balistrieri, S. and Murray, J. W., "The Surface Chemistry of Goethite (Alpha FeOOH) in Major Ion Seawater," *Am. J. Sci.* 281:788-806 (1981), which is hereby incorporated by reference in its entirety). In brief, a series of 0.1 M NaCl solutions were prepared and the initial pH of each was adjusted between 2-10 by using 1 M HCl or 1 M NaOH. 0.1 g of biochar was added to the pH adjusted 20 mL 0.1 M NaCl solutions, and the samples were equilibrated by shaking for 24 h. After the equilibration, the final pH was measured, and ApH was calculated by difference and plotted against initial pH. The pH$_{ZPC}$ was estimated from the point of the intersection of the resulting curves. Dissolved P concentration was measured colorimetrically at 880 nm by the ascorbic acid method (Rice et al., *Standard Methods for the Examination of Water and Wastewater.* 22nd Ed.; APHA, AWWA, WEF: Washington, D C. (2012); Murphy, J. and Riley, J. P., "A Modified Single Solution Method for the Determination of Phosphate in Natural Waters," *Anal. Chim. Acta* 27:31-36 (1962), which are hereby incorporated by reference in their entirety) using a mixed reagent consisting of sulfuric acid (2.5 M), ammonium molybdate (0.033 M), antimony potassium tartrate (0.009 M) and ascorbic acid (0.1 M). A standard curve was constructed with P standards (0-20 mg L$^{-1}$) before the P concentration calculation from absorbances (linear fit) of samples.

The dominant inorganic mineral phases in the biochar samples were evaluated by X-ray diffraction (XRD) (Harris, W. G. and White, G. N., "X-Ray Diffraction Techniques for Soil Mineral Identification," *Methods of Soil Analysis: Part 5—Mineralogical Methods*; Ulery, A. L., Dress, R. L., Eds.; Soil Sci. Soc. Am.: Madison, WI. 81-115 (2008), which are hereby incorporated by reference in their entirety). Random powder mounts were prepared for the XRD analysis which was conducted using fixed 0.5° divergence and 1.5° anti-scatter slits in step scan mode with a 0.05° 2θ step size and a dwell time of 7 seconds per step. The samples were analyzed from 10 to 70 degrees two-theta using Cu K$_\alpha$ radiation generated at 40 KV and 30 mA. The surface morphology and Fe and P elemental maps of biochar samples collected before and after the adsorption isotherm and column leaching studies were obtained using a scanning electron microscope equipped with an energy dispersive X-ray spectrometer (SEM-EDS) (FEI QUANTA FEG 250 SEM and Oxford Aztec EDS). The SEM-EDS analysis was performed using a 10-kV beam of about 1 nA.

Discussion of Examples 1-6

Properties of the Biochars

Properties of the various biochars are presented in Table 1. The pH changes were low for both cases, 9.2 to 8.8 and 5.4 to 5.1, for CS-control biochar and ISIB, respectively, due to the PPAO treatment. Proximate analysis shows high ash content in control biochar, which explains the high pH of this biochar as there is a strong correlation between pH and ash content of biochars (Bakshi et al., "Comparison of the Physical and Chemical Properties of Laboratory and Field-Aged Biochars," *J. Environ. Qual.* 45(5):1627-1634 (2016), which is hereby incorporated by reference in its entirety). The low pH of the ISIB is due to the hydrolysis of Fe$^{3+}$ in aqueous media leading to the formation of positively charged co-ordination complexes with O and OH groups while kicking off protons.

| Biochar | Total elemental content (%) | | | | | Proximate analysis (%) | | | pH (1:15 biochar: water) |
|---|---|---|---|---|---|---|---|---|---|
| | C | N | H | S | H/C | VM | FC | ash | |
| CS-control | 54.76 (0.47) | 1.02 (0.04) | 2.46 (0.09) | 0.06 (0.008) | 0.27 | 23.95 (1.9) | 37.15 (7.1) | 34.4 (1.4) | 9.2 (0.09) |

-continued

| Biochar | Total elemental content (%) | | | | | Proximate analysis (%) | | | pH (1:15 biochar:water) |
|---|---|---|---|---|---|---|---|---|---|
| | C | N | H | S | H/C | VM | FC | ash | |
| CS-control-PPAO | 48.56 (0.26) | 1.26 (0.02) | 1.98 (0.017) | 0.09 (0.0007) | 0.25 | 26.18 (1.4) | 32.58 (2.08) | 38.9 (2.56) | 8.8 (0.03) |
| ISIB | 36.42 (1.56) | 1.21 (0.02) | 1.63 (0.017) | 5.03 (0.14) | 0.27 | 33.98 (0.52) | 23.98 (2.08) | 39.8 (7.1) | 5.4 (0.12) |
| ISIB-PPAO | 27.85 (0.87) | 1.42 (0.014) | 0.97 (0.05) | 6.02 (0.16) | 0.21 | 34.91 (0.52) | 14.35 (1.6) | 49.5 (7.2) | 5.1 (0.07) |

* standard deviation (n = 3)

The ratio of volatile matter ("VM") to fixed carbon ("FC") in the biochars increased due to both the $FeSO_4$ and PPAO treatments (Table 1). The VM to FC mass ratios increased from 0.645 to 0.803 for the CS-control and from 1.42 to 2.43 for the ISIB following the PPAO treatments. These results indicate that some of the FC was converted to thermally less stable VM as a result of both the $FeSO_4$ and PPAO treatments. From the total elemental analysis, it is evident that the PPAO treatment decreased the H/C molar ratios slightly for both biochars, indicating the preferential elimination of H over C due to the PPAO treatment which is consistent with the previous study (Xiao, F. and Pignatello, J. J., "Effects of Post-Pyrolysis Air Oxidation of Biomass Chars on Adsorption of Neutral and Ionizable Compounds," *Environ. Sci. Technol.* 50(12):6276-6283 (2016), which is hereby incorporated by reference in its entirety).

Figure 1B:
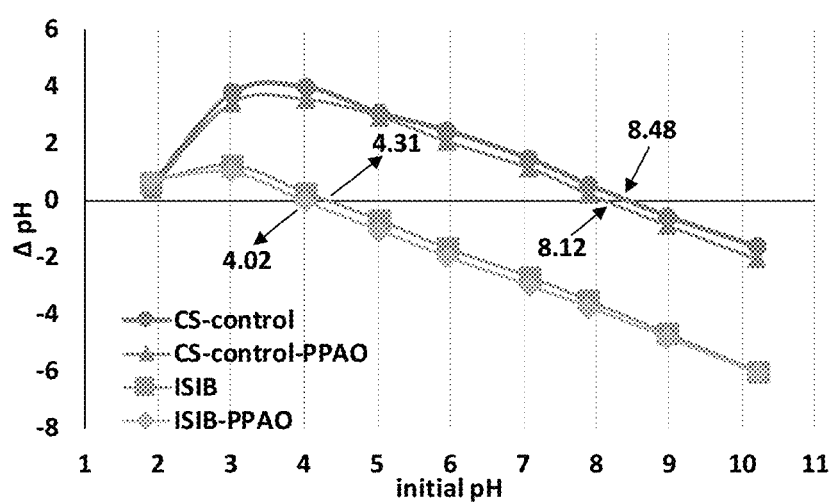

The zero-point of charge ($pH_{ZPC}$) for the biochars (FIG. 1) indicates the dominance of acid functional groups in the ISIB, as the $pH_{ZPC}$ value shifts from 8.48 to 4.31 due to Fe impregnation. The $\Delta pH$ value was positive in the pH range of 2-8 for CS-control biochars (both PPAO and non-PPAO), which indicates the dominance of the positive surface charge in that pH range. Because the pH of the CS-control biochars (Table 1) was above the $pH_{ZPC}$, it can be inferred that ionization or dissociation of acidic functional groups (carboxyl and hydroxyl) and a net negative surface charge when the CS-control biochars are equilibrated in DI water. The same scenario was evident (the $\Delta pH$ value is positive in the pH range of 2-4) for the ISIB, which suggests the dominance of the surface negative charge for all biochars in DI water. From the $pH_{PZC}$ results (FIG. 1), it is inferred that the PPAO treatment slightly increased the density of the acidic functional groups on the biochar surfaces.

Adsorption/Desorption Isotherm and Kinetic Phenomenon

Figure 2A:
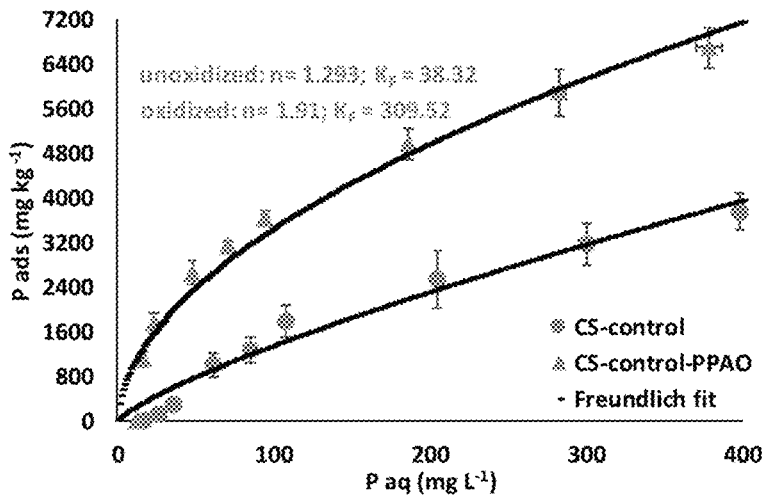
FIGS. 2A-2B are a pair of plots of P (phosphate) adsorption isotherms of the CS-control (FIG. 2A) and ISIB (FIG. 2B) under non-PPAO and PPAO conditions; data are fitted to the Freundlich and Langmuir isotherm models. Error bars represent standard deviation (n=3). Error bars that are not visible are smaller than the symbol. Adsorption isotherm conditions: shaking of 0-400 mg $L^{-1}$ of P solution with biochar for 48 h, solid loading rate 5 g $L^{-1}$.
Figure 2B:
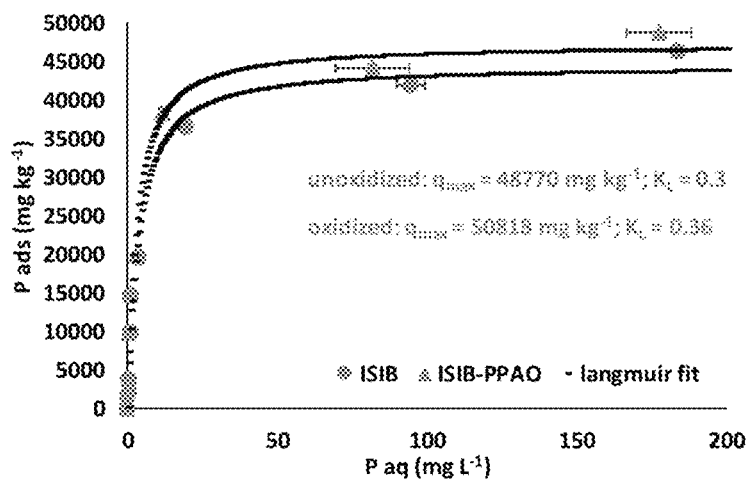

The batch equilibrium study indicates rapid and substantial adsorption of P onto ISIB. The relationship between P equilibrium concentration in solution (mg $L^{-1}$) and P sorbed (mg $g^{-1}$) on biochar is well described by the Freundlich isotherm for CS-control biochar and the Langmuir isotherm for ISIB biochar ($R^2 \geq 0.94$; FIGS. 2A-2B). FIGS. 2A-2B shows that there was an 11-12-fold increase in P adsorption on ISIB (in both PPAO and non-PPAO cases) compared to the CS-control biochars. The amount of P adsorbed from the highest concentration solution (46,300 and 48,821 mg $kg^{-1}$ for non-PPAO and PPAO ISIB, respectively) and the adsorption maxima ($q_{max}$) as predicted by the Langmuir isotherm model were in close agreement (48,770 and 50,818 mg $kg^{-1}$ for non-PPAO and PPAO samples, respectively). By contrast, when challenged with the highest P initial concentration the adsorption capacities were only 3,763 and 6,704 mg $kg^{-1}$ for CS-control and CS-control-PPAO biochars, respectively. These results suggest that ISIB is much more effective than the CS-control biochars in adsorping P. Also, the PPAO treatment is improve the P adsorption onto ISIB surface (5.4% increase in P adsorption), however, it is even more effective to improve the P adsorption onto CS-control biochar surface (78% increase in P adsorption). Moreover, CS-control biochar and ISIB required different isotherm models to fit the experimental data, which suggests that the adsorption of P on these biochars is governed by different mechanisms.

Figure 3A:
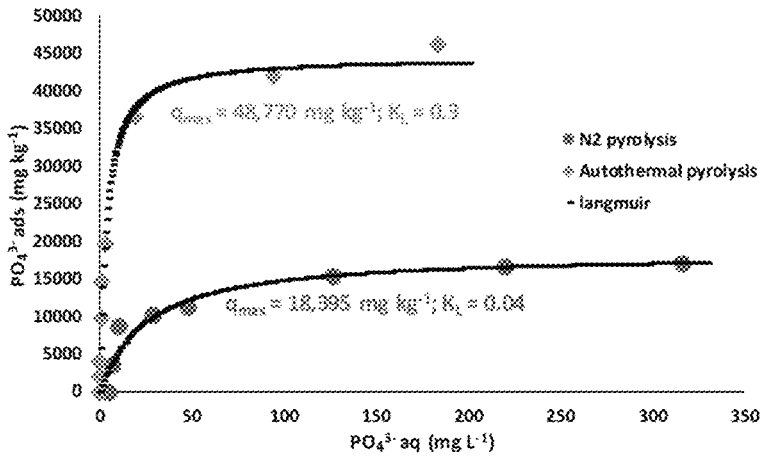
FIGS. 3A-3B are a pair of plots of Phosphate adsorption efficiencies of the Fe-impregnated biochars produced under $N_2$ and autothermal pyrolysis after un-oxidized (FIG. 3A); and oxidized conditions (FIG. 3B).
Figure 3B:
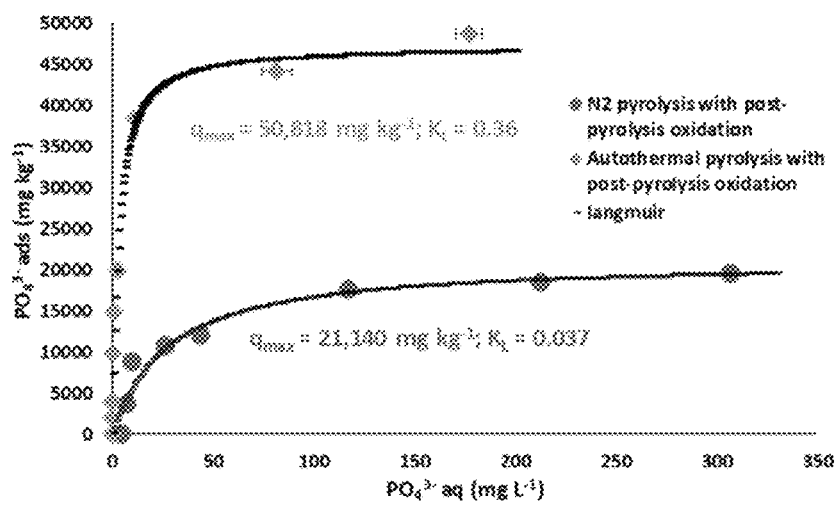

In comparison to the oxidative pyrolysis, the non-oxidative pyrolysis showed weaker P adsorption capabilities. The Langmuir $q_{max}$ values for autothermal pyrolysis are ~2.5 times higher than that of $N_2$ pyrolysis which is the experimental indicator of maximum phosphate sorption capacity (FIGS. 3A-3B). This data clearly shows that the autothermal pyrolysis is augmenting the phosphate sorption capacity of the produced biochar.

There are four forms of ortho-P, which dominate in different pH ranges ($H_3PO_4$ at pH<2.12, $H_2PO_4^-$ at pH between 2.12-7.21, $HPO_4^{2-}$ at pH between 7.21-12.67, and $PO_4^{3-}$ at pH>12.67). The pH of the solution was measured after 48 h. The equilibrium pH of the CS-control biochar was 8.2-8.7 and 8.1-8.5 and the pH of the ISIB was 6.3-6.6 and 5.9-6.4, for non-PPAO and PPAO samples, respectively. These pH values suggest the dominant form of P was $HPO_4^{2-}$ for the CS-control biochars and $H_2PO_4^-$ for the ISIB. Also, the pH values were close to the $pH_{ZPC}$ of the CS-control biochars, which indicates neutral to slightly negative surface charge whereas the pH values were higher than the $pH_{ZPC}$ for the ISIB, which indicates dominance of negative surface charge. Based on the $pH_{ZPC}$ and different forms of P, it was determined that the $HPO_4^{2-}$ was retained on the CS-control biochars by anion exchange whereas the predominance of ligand exchange for retention of $H_2PO_4^-$ on the ISIB. Also, it should be noted that $H_2PO_4^-$ ion carries only one negative charge while the $HPO_4^{2-}$ ion carries two negative charges which might be the another plausible reason for higher P adsorption capacity of ISIB compare to CS-control biochar.

Figure 4A:
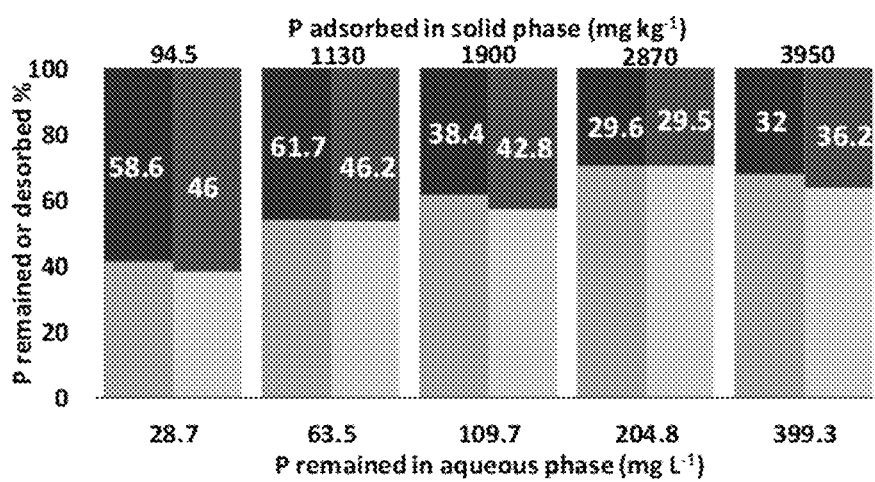
FIGS. 4A-4D are graphs showing the desorption pattern of the biochars of the present application.
Figure 4B:
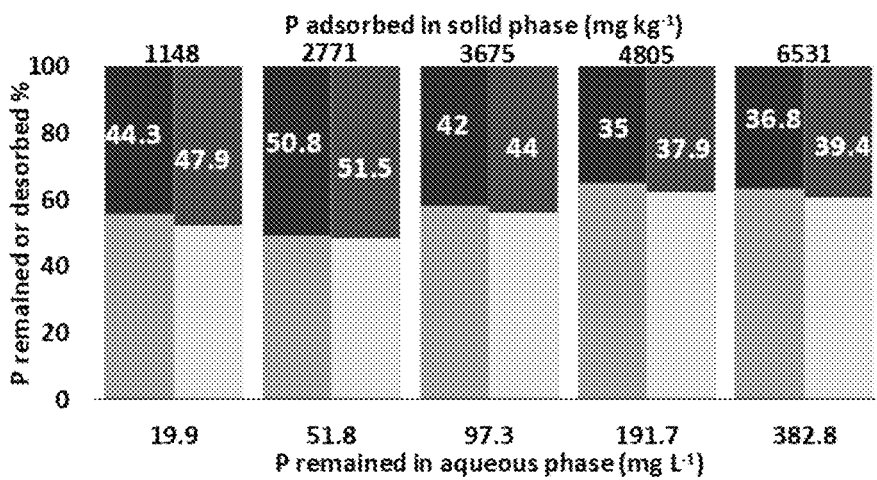
Figure 4C:
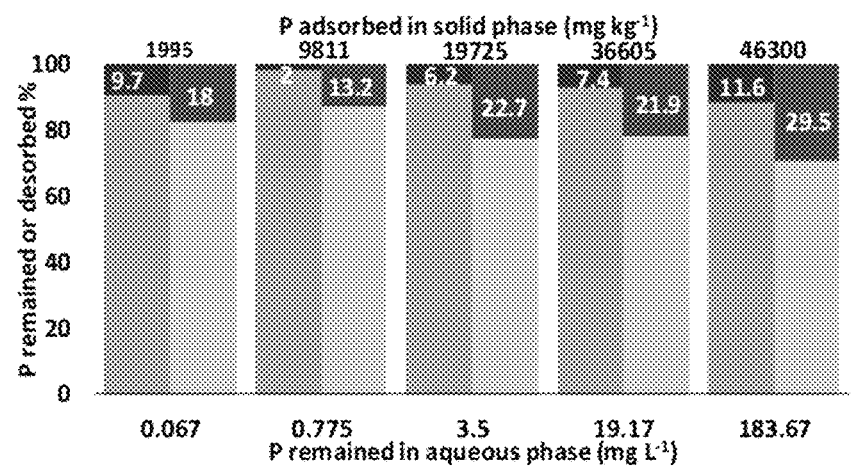
Figure 4D:
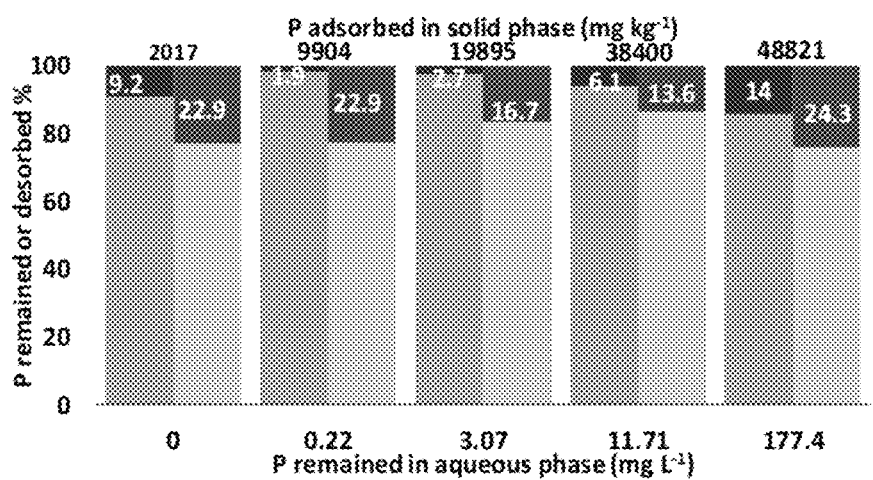

Data is provided on the three-step desorption of P (48 h) with DI water and one-step desorption of P (48 h) with M-III from selected sorption points for the various biochars (FIGS. 4A-4D). After three cycles of DI water desorption 29-62% of the sorbed P was desorbed from the CS-control biochar and 35-51% of the sorbed P was desorbed from the CS-control PPAO biochar (FIGS. 4A and 4B). For the ISIB, 2-12% of the sorbed P was desorbed and the PPAO treatment changed the desorption rate to 1.9-14% (FIGS. 4C and 4D). The M-III extracted similar amounts or slightly more P from P loaded CS-control biochars than DI water. In contrast, substantially more P was extracted by M-III than DI water from the ISIB (2-6 times and 1.5-11 times more for non-PPAO and PPAO samples, respectively).

The results of the batch kinetic study showed rapid adsorption of P onto ISIB. The amount of P adsorbed was 46.1% and 57% of added P after 2 h of equilibration and 60% and 65.2% after 48 h equilibration for the ISIB non-PPAO and PPAO samples, respectively. In contrast, the CS-control biochar adsorbed only 1.54% and 5.2% of the added P after 2 hr and 4.62% and 8.4% of the added P after 48 hr for the non-PPAO and PPAO samples, respectively. Kinetic data suggested that the P adsorption occurred rapidly during the first 2 h and slowed thereafter. This phenomenon could be explained by the rapid formation of outer-sphere complexes followed by the slower formation of inner-sphere complexes (Essington, M. E., *Soil and Water Chemistry-An Integrative Approach*, CRC Press: Boca Raton, FL. (2004), which is hereby incorporated by reference in its entirety). The PPAO treatment had a larger effect on the CS-control biochar than the ISIB as the CS-control PPAO biochar adsorbed almost twice as much P as the CS-control sample, whereas the PPAO treatment increased P adsorption by ~10% for the ISIB biochar. These results suggest that Fe-oxides provided the dominant sites for P adsorption on ISIB biochar surfaces as such surfaces are little affected by the PPAO treatment.

Figure 5A:
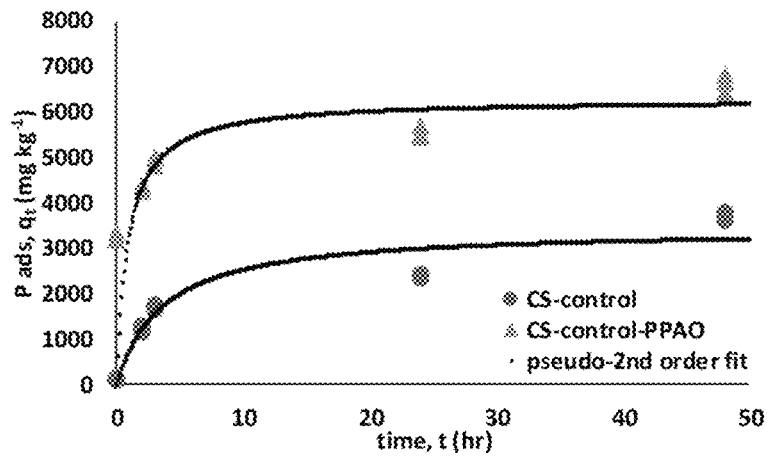
FIGS. 5A-5B are a pair of plots of the P adsorption kinetics for CS-control biochar (FIG. 5A) and ISIB (FIG. 5B). The data are fit to the pseudo $2^{nd}$ order kinetics model (n=3). Some symbols are obscured by others. Adsorption kinetics conditions: 400 mg $L^{-1}$ of P solution (pH~8) was shaken with biochar for 0, 2, 3, 24 and 48 h, with a solid loading rate 5 g $L^{-1}$.
Figure 5B:
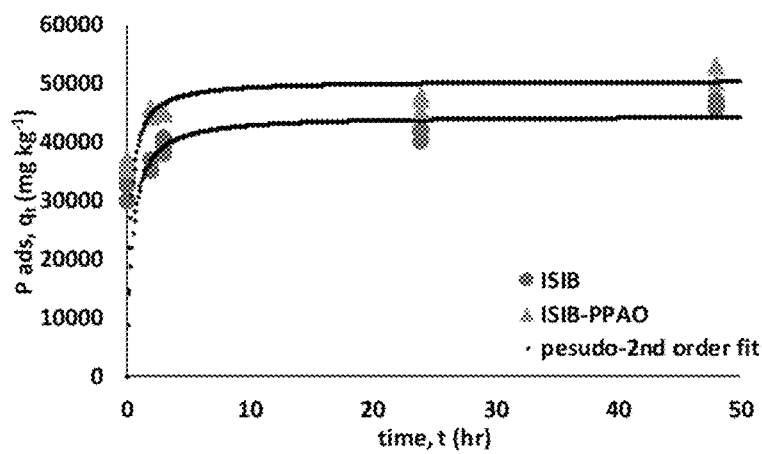

The pseudo second order kinetic model was used to describe the P adsorption data (FIGS. 5A-5B). By plotting the linear form of $t/q_t$ vs $t$ (where $q_t$=amount of P adsorbed at time t (mg kg$^{-1}$)), strong correlations ($R^2 \geq 0.95$) for all cases were found, suggesting P adsorption onto biochar surfaces is a chemisorption process. Moreover, the calculated P adsorption values after 48 h equilibrium, expressed as $q_e$ (mg kg$^{-1}$) values were in good agreement with the experimental $q_e$ (3,754 and 6,458 mg kg$^{-1}$ for CS-control biochars and 47,254 and 50,125 mg kg$^{-1}$ for ISIB for the non-PPAO and PPAO samples, respectively) and the Langmuir $q_{max}$ values. An intra-particle diffusion model was also examined to evaluate the rate parameter using the equation $q_t=k_{int}t^{0.5}+C$. However, the multilinear plots did not pass through the origin in either case. This suggests that intra-particle diffusion was not the rate-limiting step.

Column Leaching Experiment

Figure 6A:
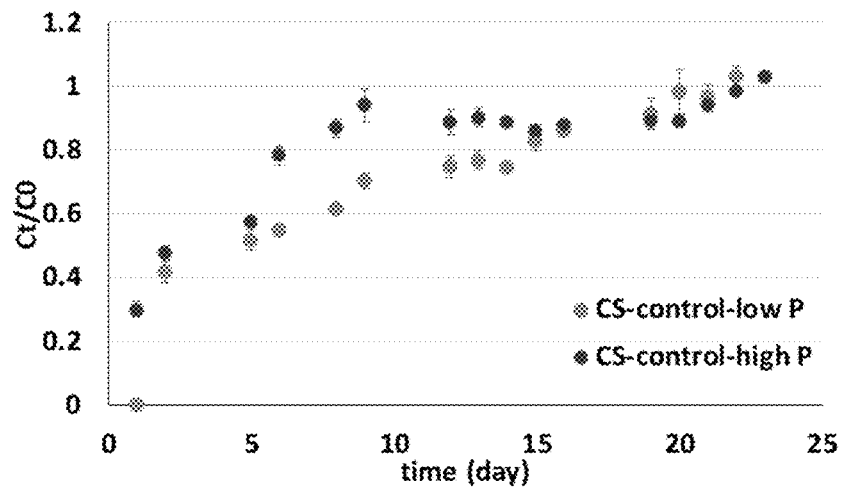
FIGS. 6A-6D are plots of the breakthrough curves of CS-control biochar (FIG. 6A) and ISIB (FIG. 6B) and changes in cumulative P adsorption of CS-control biochar (FIG. 6C) and ISIB (FIG. 6D) with leaching volume in the column leaching study using simulated agricultural effluent. Conditions for the column leaching study: influent P concentrations were 10 and 80 mg $L^{-1}$; influent volume each time was 50 mL. Standard deviation error bars that are not visible are smaller than the symbol.
Figure 6B:
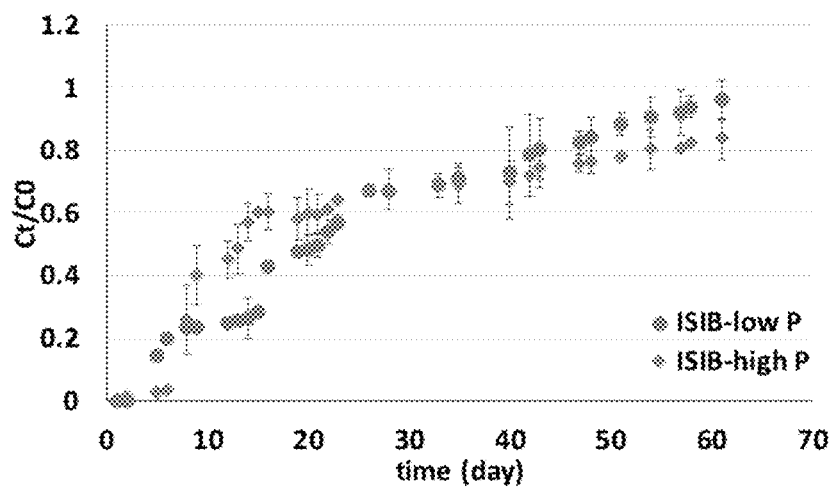
Figure 6C:
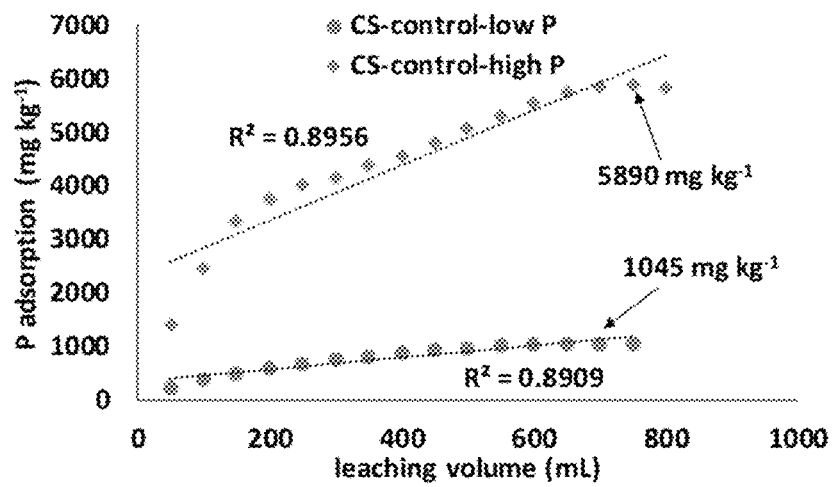
Figure 6D:
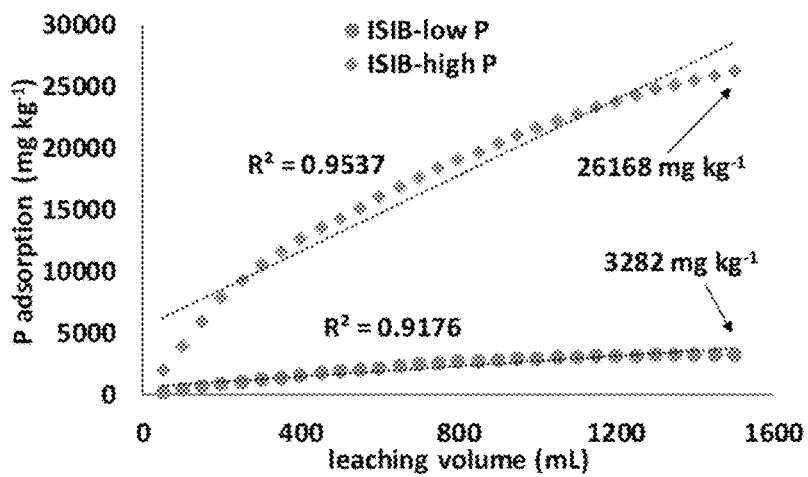
Figure 7A:
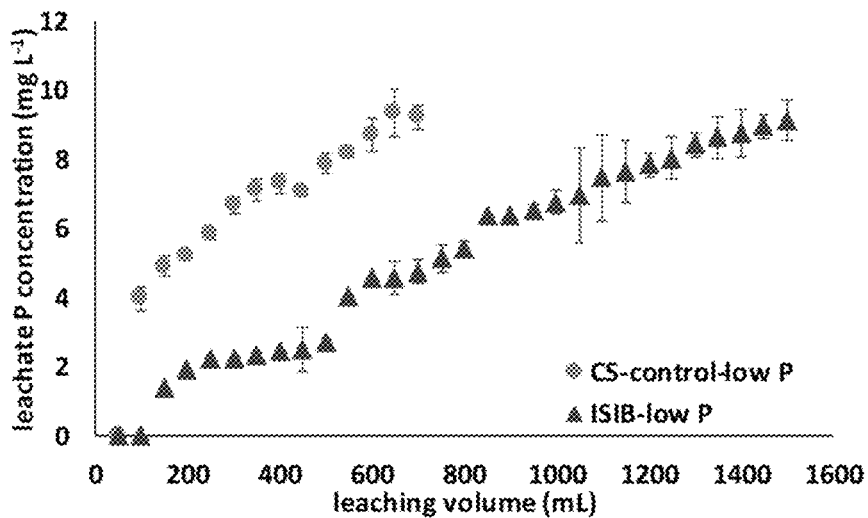
FIGS. 7A-7B are a pair of plots of the P concentration changes in leachates for low P (FIG. 7A) and high P (FIG. 7B) influents used in the column leaching study for CS-control biochar and ISIB. Conditions for the column leaching study: influent P concentrations were 10 and 80 mg $L^{-1}$; influent volume each time was 50 mL. Standard deviation error bars that are not visible are smaller than the symbol.
Figure 7B:
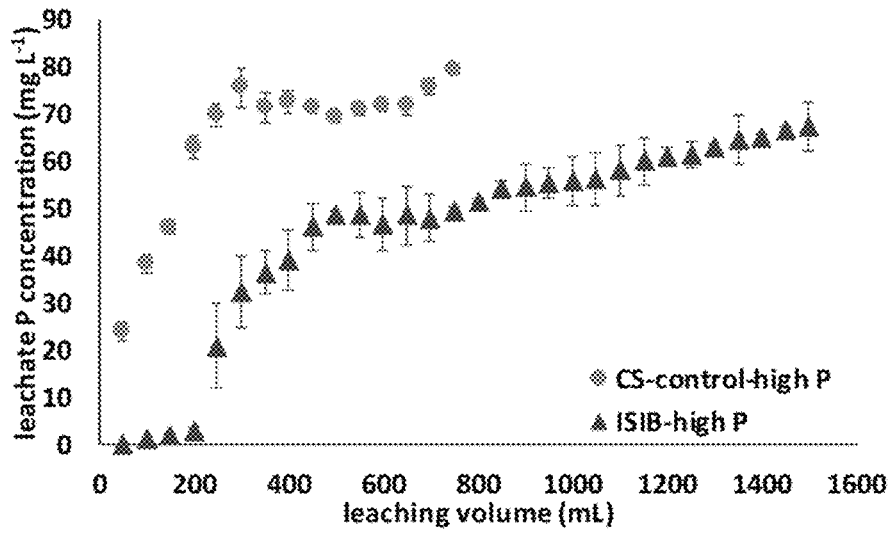

The column leaching study using the simulated agricultural effluent showed that ISIB is effective in removing P from water (FIGS. 6A-6D). The breakthrough curve showed saturation ($C_t/C_0>1$, where $C_t$ is the effluent P concentration in mg/L and $C_0$ is the influent P concentration in mg L$^{-1}$ for each influent addition) for the CS-control biochar columns after 14 and 15 leaching events (FIG. 6A) for low and high PCW, respectively. The ISIB columns showed no evidence of saturation even after 30 leaching events (day 60) for low P ($C_t/C_0=0.96$) and high P ($C_t/C_0=0.84$) loaded influents (FIG. 6B). The P concentration in the leachates was much lower for the ISIB columns than the CS-control biochar columns (FIGS. 7A and 7B). No detectable P was found after two leaching events (100 mL) from ISIB columns with the low PCW (FIG. 7A), suggesting the potential for complete removal of P from agricultural effluent of very low P concentration. Moreover, low levels of P (3 mg L$^{-1}$) were found after 4 leaching events (200 mL) from ISIB columns with the high PCW (FIG. 7B), suggesting the efficacy of the material for removing P from effluents with high P concentrations.

The P concentration in leachates from the CS-control biochar columns reached 9.4 and 79.4 mg L$^{-1}$, respectively, for low and high PCW after 14 and 15 leaching events. Leachates from the ISIB columns ended up with 9.16 and 67.4 mg L$^{-1}$ after 30 leaching events. The CS-control biochar columns removed 31.3% and 19.5% of the added P at the end of the 14 and 15 leaching events, respectively, for low and high PCW. By contrast, the ISIB columns removed 46% and 43.4% of the added P after 30 leaching events. The cumulative P removal (P adsorption) increases with time (and influent volume) for all columns; however, the ISIB columns were substantially more effective for removing P than the CS-control biochar columns for both PCW (FIGS. 6C and 6D). Strong linear correlations between leaching volume (mL) and P sorption (mg kg$^{-1}$) were found for the ISIB columns ($R^2>0.91$) even after 30 leaching events whereas the relationship started to collapse after 14 leaching events for the CS-control biochar columns. This result suggests the release of some previously adsorbed P as the controls approached saturation. Overall, the amounts of P adsorbed by the CS-control biochars were 1,045 and 5,890 mg kg$^{-1}$ (FIG. 6C) and 3,282 and 26,168 mg kg$^{-1}$ for the ISIB (FIG. 6D) for the low and high PCW, respectively. The column leaching study indicates that the ISIB is substantially more efficient (~3 and 5 times) than the CS-control biochar, however, the presence of competing anions possibly reduced the P adsorption capacities of ISIB to some extent relative to adsorption capacities observed for the batch equilibration study.

The desorption of P from biochar recovered from the column study was measured using the M-III solution. The M-III solution removed 46.9-57.8% and 25.5-28.4% of the adsorbed P from the CS-control biochar and the ISIB, respectively. The P desorption rates were slightly higher in the column study compared with the batch equilibration study for the ISIB, whereas the desorption rates were similar for the batch equilibration and column leaching studies for CS-control biochars.

The ISIB was less efficient as a P adsorbent in the column leaching study compare with the batch equilibration study. A similar phenomenon was observed for the adsorption of As in a previous study that involved zero-valent iron biochar complexes (Bakshi et al., "Arsenic Sorption on Zero-Valent Iron-Biochar Complexes," *Water Res.* 137:153-163 (2018), which is hereby incorporated by references in its entirety). In the previous study, it was inferred that pre-equilibration with water in the column study caused oxidation of zero valent Fe before the As was introduced into the columns. In the present application, exposure to $O_2$ and water during the column study before the P was introduced may have promoted Fe oxyhydroxides formation, which limited the potential for P—Fe complex formation (Dixit, S. and Hering, J. G., "Comparison of Arsenic(V) and Arsenic(III) Sorption onto Iron Oxide Minerals: Implications for Arsenic Mobility," *Environ. Sci. Technol.* 37(18):4182-4189 (2003); Badruzzaman et al., "Intraparticle Diffusion and Adsorption of Arsenate onto Granular Ferric Hydroxide (GFH)," *Water Res.* 38(18):4002-4012 (2004), which are hereby incorporated by reference in their entirety). Also, other anions in the simulated effluent may have competed with P for ligand exchange sites on the Fe oxyhydroxide surfaces.

Interpretation of XRD Analysis

Figure 8:
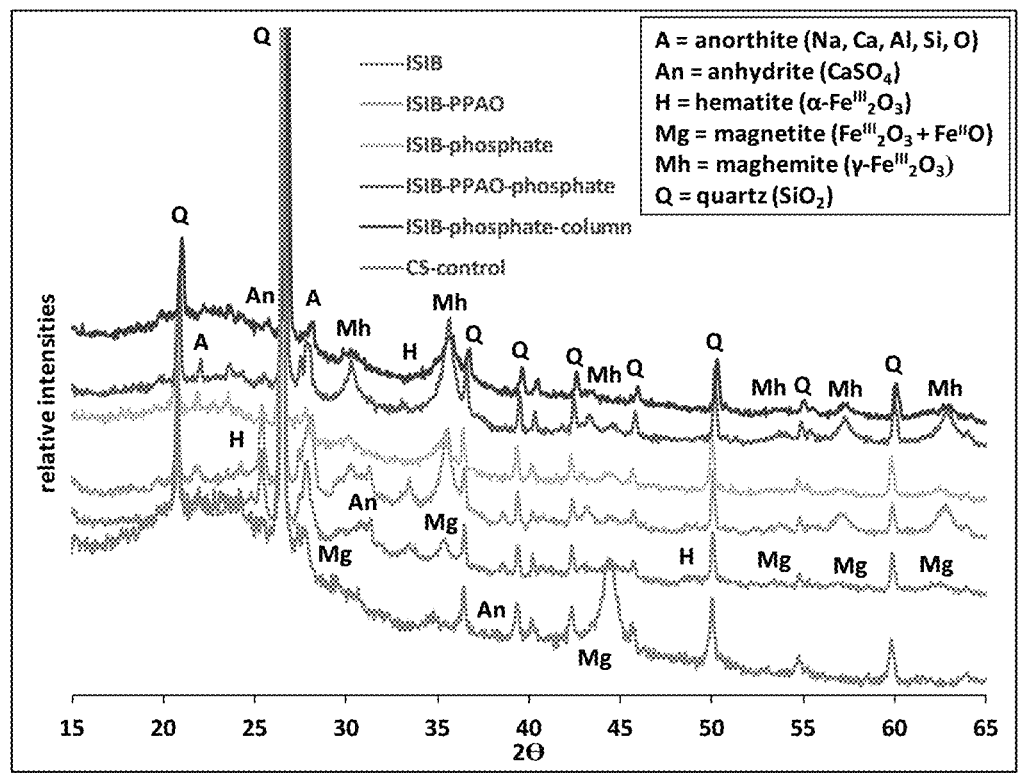
FIG. 8 is an overlay of the XRD analysis of the biochars of the present application.

XRD analysis of the biochars was used to determine the dominant inorganic mineral phases (FIG. 8). XRD patterns of ISIB have prominent hematite ($\alpha$-Fe$_2$O$_3$) and magnetite (Fe$^{III}_2$O$_3$+Fe$^{II}$O) peaks, indicating that much of the Fe$^{2+}$ in the FeSO$_4$ was oxidized to Fe$^{3+}$. Oxidation most likely occurred during oven drying of FeSO$_4$ treated biomass or after pyrolysis. The formation of magnetite in the ISIB suggests the partial reduction of Fe$^{3+}$ to Fe$^{2+}$ during pyrolysis. The XRD pattern of the PPAO ISIB sample indicates the greater maghemite (γ-Fe$_2$O$_3$) than magnetite, which suggests that some magnetite was oxidized to maghemite during the PPAO treatment (Khan et al., "Transformation Mechanism of Magnetite Nanoparticles," *Mater. Sci.* 33(2):278-285 (2015), which is hereby incorporated by reference in its entirety). Moreover, the intensities of the hematite peaks were increased due to the PPAO treatment, but no peak shifting was observed. Formation of anorthite (Na, Ca, Al silicate-a feldspar mineral) and anhydrite (CaSO$_4$) in the ISIB was also observed, suggesting the passivation of the alkali and alkaline earth metals due to the FeSO$_4$ pretreatment. For the CS-control biochar the presence of only quartz (SiO$_2$) and anorthite minerals was observed, suggesting the presence of amorphous forms of the alkali and alkaline earth metals.

The XRD patterns of biochars pre- and post-P adsorption from the batch equilibration and column leaching studies were similar (FIG. 8). No new Fe—P minerals were found after P adsorption. However, the intensities of the hematite peaks (2θ degrees of 33.2, 24.12 and 49.4) in the XRD patterns of the post adsorption biochar samples (both non-PPAO and PPAO samples) were significantly reduced compared to the XRD patterns for the pre-adsorption biochar samples, which suggests either changes in the structure or particle size of the hematite phase due to intercalation of P or possibly transformation of hematite to amorphous Fe oxy(hydroxides) due to temporary reducing conditions during the batch equilibration and column leaching experiments. In contrast, no changes in the magnetite or maghemite peaks occurred during the P adsorption reaction. Hence, the XRD evidence suggests that P was primarily adsorbed by the hematite phase and that adsorption of P impacted the crystallinity of hematite particles. A solid state transformation hematite is possible due to the presence of a larger number of open facets {104} with Lewis acid adsorption sites on hematite, which are not present on magnetite or maghemite (Makie et al., "Adsorption of Trimethyl Phosphate on Maghemite, Hematite, and Goethite Nanoparticles," *J. Phys. Chem. A* 115 (32):8948-8959 (2011), which is hereby incorporated by reference in its entirety).

The pH$_{ZPC}$ of the Fe oxides present in the ISIB influenced the P adsorption reaction onto biochar surface. The pH$_{ZPC}$ of magnetite (Shahid et al., "Magnetite Synthesis Using Iron Oxide Waste and Its Application for Phosphate Adsorption with Column and Batch Reactors," *Chem. Eng. Res. Des.* 148:169-179 (2019), which is hereby incorporated by reference in its entirety) and maghemite (Pashai Gatabi et al., "Point of Zero Charge of Maghemite Decorated Multiwalled Carbon Nanotubes Fabricated by Chemical Precipitation Method," *J. Mol. Liq.* 216:117-125 (2016), which is hereby incorporated by reference in its entirety) are 6.6 and 3.63, respectively, whereas the pH$_{ZPC}$ of hematite has been reported as 8.5-9.3 (Chatman et al., "Surface Potentials of (001), (012), (113) Hematite(α-Fe$_2$O$_3$) Crystal Faces in Aqueous Solution," *Phys. Chem. Chem. Phys.* 15:13911 (2013), which is hereby incorporated by reference in its entirety) and 7-9 (Schudel et al., "Absolute Aggregation Rate Constants of Hematite Particles in Aqueous Suspensions: A Comparison of Two Different Surface Morphologies," *J. Colloid Interface Sci.* 196(2):241-253 (1997), which is hereby incorporated by reference in its entirety). The pH$_{ZPC}$ of ferrihydrite is 7-9 (Schwertmann, U. and Fechter, H., "The Point of Zero Charge of Natural and Synthetic Ferrihydrites and Its Relation to Adsorbed Silicate," *Clay Miner.* 17(4):471-476 (1982), which is hereby incorporated by reference in its entirety), which is close to that of hematite, so the possibility of a change in crystalline phase due to temporary reducing conditions during the adsorption reactions cannot be dismissed. P adsorption onto a Fe-oxide phase is favored when the pH is below the pH$_{ZPC}$ of the phase, hence hematite is preferred over magnetite or maghemite for P adsorption under experimental conditions in the study, where the equilibrium pH after batch equilibration study was 6.3-6.6 and 5.9-6.4 for non-PPAO and PPAO samples, respectively. The peaks for anhydrite disappeared or had lower intensity in the XRD patterns of the post adsorption biochar samples compare to the XRD patterns of the pre-adsorption samples. The solubilization of anhydrite during the P adsorption experiment is the probable explanation for this observation.

Interpretation of SEM-EDS Analysis

Figure 9A:
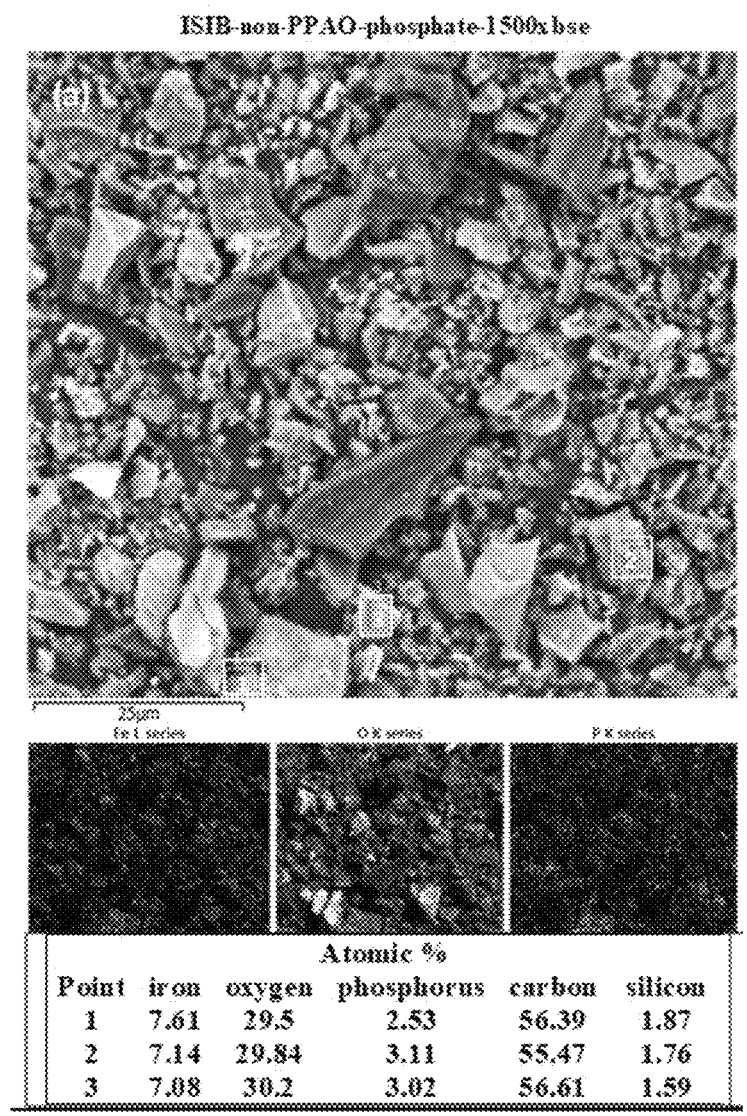
FIGS. 9A-9B show the SEM-EDS analysis of the ISIB after P adsorption recovered after 48 h batch equilibration study at low magnification (1500×) (FIG. 9A) and high magnification scales (10000×) (FIG. 9B).
Figure 9B:
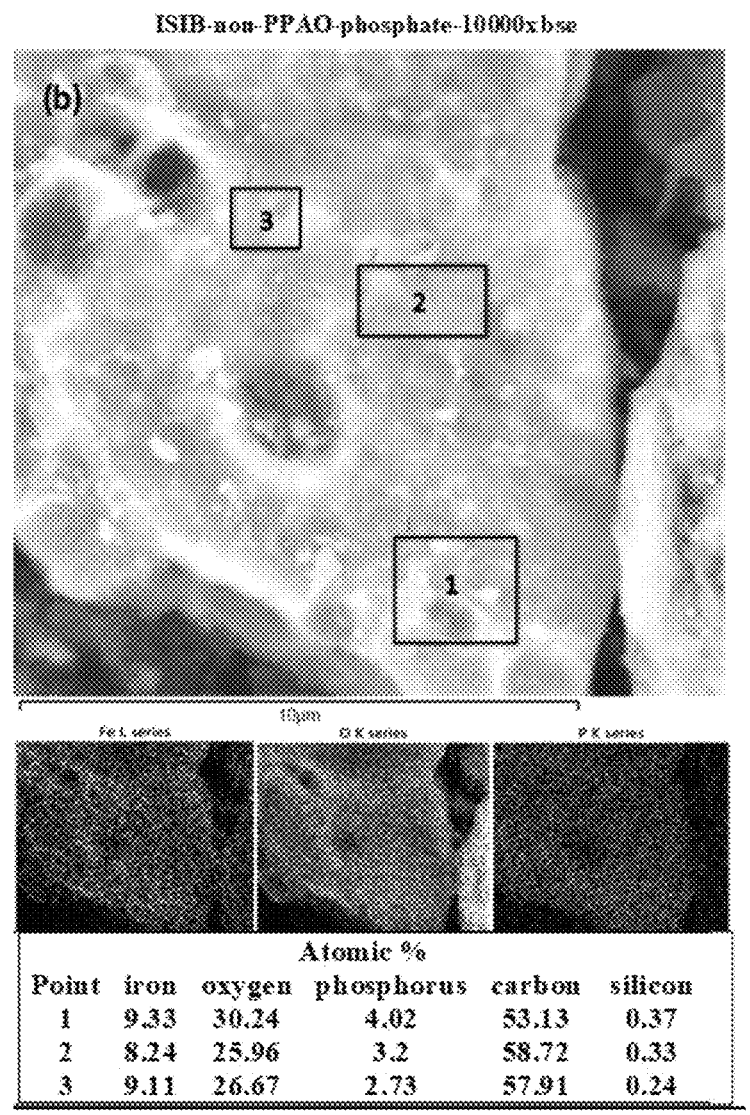

The SEM-EDS analysis of the ISIB sample (non-PPAO) recovered after 48 h batch equilibration was done at two magnification scales-1500× and 10,000× to investigate particle morphology and the distribution and stoichiometry of Fe, O, P, C, and Si (FIG. 6). The SEM-EDS analysis of three particles (points 1, 2 and 3 in FIG. 9A) suggest a stoichiometry of 7-7.5 atom % Fe, 29-30 atom % O, 2.5-3 atom % P and 55-57 atom % C. Similar stoichiometry was also observed at higher magnification for three separate locations (FIG. 9B) on one of the particles (point 2 of FIG. 6A). Based on the stoichiometry, it can be inferred that these are biochar particles coated with an Fe-oxyhydroxide/P phase. The lack of evidence for discrete Fe-rich particles and the detection of 55-57 atom % C from the underlying biochar particle suggests that the surface coatings are relatively thin and poorly crystalline. The stoichiometry of the surface coatings indicates approximately 2 Fe atoms coordinated with 1 phosphorus atom and 7-10 O atoms. The disappearance of the hematite XRD peaks after samples were equilibrated with KH$_2$PO$_4$ solutions and the appearance of diffuse ~O-Fe—O—Fe—O-PO$_4$H~ films coating on the biochar particles after the equilibration suggests that the hematite was decomposed and transformed into the amorphous surface ~O-Fe—O—Fe—O-PO$_4$H~ films during the equilibration.

Figure 10A:
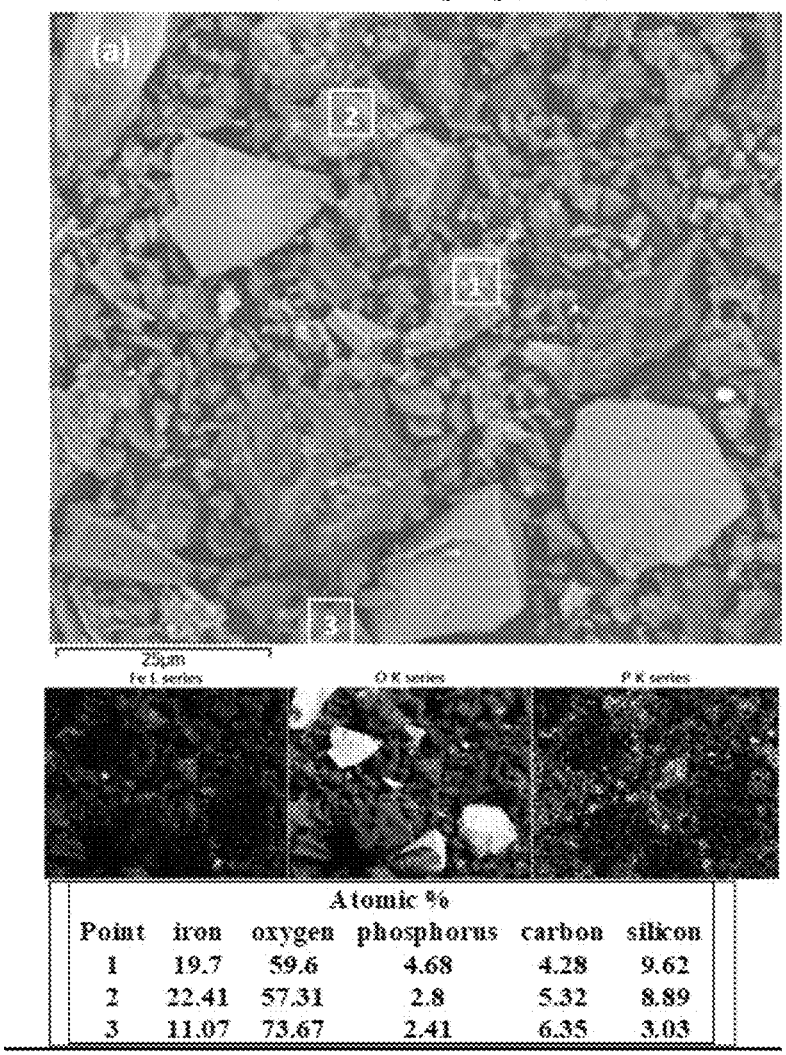
FIGS. 10A-10B show the SEM-EDS analysis of the ISIB after P adsorption recovered after column leaching study at low magnification (1500×) (FIG. 10A) and high magnification scales (10000×) (FIG. 10B).
Figure 10B:
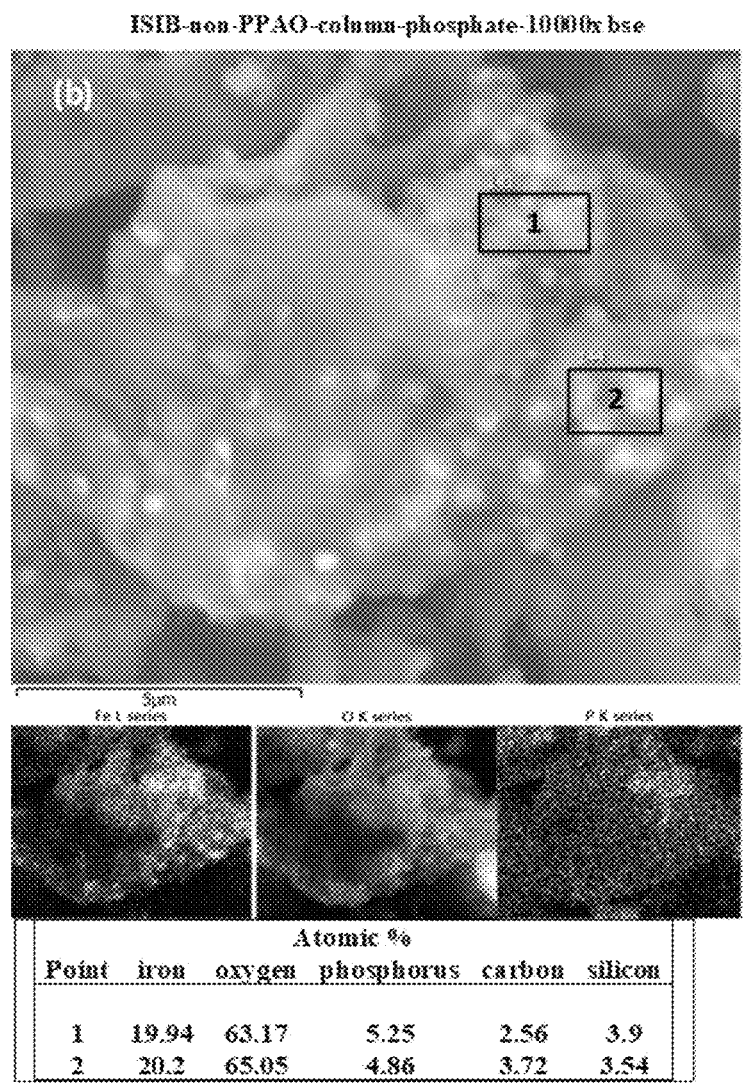

The SEM-EDS analysis of the ISIB sample (non-PPAO) recovered after the column leaching study was also done at two magnification scales, 1500× and 10,000×, to investigate particle morphology and the distribution and stoichiometry of Fe, O, P, C, and Si (FIGS. 10A-10B). The SEM-EDS analysis at point 1 (FIG. 10A) suggests about 20 atom % Fe, 60 atom % O, 4.7 atom % P, 9.6 atom % Si and only 4.3 atom % C. Similar stoichiometry was observed at point 2 and for two small locations on the point 2 particle observed at higher magnification (FIG. 10B). The higher atom % Fe, O and Si and lower atom % C observed at points 1 and 2 in samples recovered from the column study relative to samples recovered from the batch equilibration study suggests that the surface films that formed on biochar particles in the column study are thicker than those that formed in the batch equilibration study. Point 3 in FIG. 10B has a different stoichiometry with 11 atom % Fe, 73.7 atom % O, 2.4 atom % P, 3 atom % Si and 6.3 atom % C. The lower Fe and higher O content of the particle at point 3 suggests that other elements present in the simulated influent may have co-precipitated with the Fe to form this particle. The stoichiometry of the surface coatings indicates approximately four Fe atoms coordinated with one phosphorus atom. The higher ratio of Fe to P association in column leaching study compare to batch equilibration study suggests the possible association of Fe with other competing ions and exhaustion of Fe supply may have limited P adsorption. The higher atom % Si in particles of the ISIB sample recovered after column leaching suggests possible admixing of Si from the sand used in the study. The SEM-EDS analysis of ISIB recovered from the column leaching study indicates that P is again diffusely scattered on the particle surfaces and that it is associated with Fe rich phases. The differences in film thickness and stoichiometry between batch equilibrium and column studies are attributed to differences in the experimental conditions including the presence of competing ions and the mass transfer limitation of the competing ions in the simulated effluent that was not present in the batch equilibration study. The findings of the SEM-EDS analysis are consistent with the results of batch equilibrium and column leaching studies, as P sorption onto ISIB was significantly lower in column leaching study than the batch equilibration study.

Adsorption/Desorption Mechanism

P adsorption on different Fe oxyhydroxide phases is influenced by differences in surface area, porosity, the abundance of exposed sites, and solubility (Wang et al., "Characteristics of Phosphate Adsorption-Desorption Onto Ferrihydrite: Comparison With Well-Crystalline Fe (Hydr) Oxides," *Soil Sci.* 178:1-11 (2013); Arai, Y. and Sparks, D. L., "ATR-FTIR Spectroscopic Investigation on Phosphate Adsorption Mechanisms at the Ferrihydrite-Water Interface," *J. Colloid Interf Sci.* 241:317-326 (2001), which are hereby incorporated by reference in their entirety). The possible mechanism for P adsorption onto biochar surfaces include surface complexation by ligand exchange and electrostatic attraction between P anion and positively charged surface sites (Cornell, R. M. and Schwertmann, U., *The Iron Oxides: Structure, Properties, Reactions, Occurences, And Uses,* 2nd ed.; Wiley-VCH: Weinheim (2003), which is hereby incorporated by reference in its entirety), although controversies exist between surface complexation and precipitation in the literature (Ler, A. and Stanforth, R., "Evidence for Surface Precipitation of Phosphate on Goethite," *Environ. Sci. Technol.* 37:2694-2700 (2003), which is hereby incorporated by reference in its entirety).

The batch equilibration and kinetic studies indicate that P adsorption on the ISIB increases with increasing P concentration until the ISIB is saturated as evidenced by a well-defined isotherm plateau. The plateau of the P adsorption isotherm for the ISIB could be explained by the exhaustion of the Fe supply (6.8% Fe incorporation onto ISIB as determined by the acid digestion & ICP-OES method) needed for the co-precipitation mechanism. The XRD analysis suggests the disappearance of the hematite peaks after the batch equilibration and column leaching studies. This phenomenon suggests two probable scenarios. Firstly, the presence of large amounts of labile C (high VM content of the ISIB samples reported in Table 1) during the batch equilibration and column leaching study may have promoted temporary anaerobic conditions, which led to the reduction of $Fe^{3+}$ to $Fe^{2+}$ and the solubilization of hematite, followed by the precipitation of amorphous Fe—O—P films onto the biochar surfaces. Secondly, the adsorption of P caused the loss of crystallinity for hematite particles due to the incorporation of $PO_4$ into the hematite crystal lattice structure. The SEM-EDS analysis suggests the formation of Fe—O—P films onto the biochar surfaces, which is consistent with the former scenario rather than the later.

It can be inferred that the ligand exchange mechanism followed by the precipitation mechanism are responsible for the high P adsorption in the batch equilibration study under the experimental conditions. In the column leaching study, columns were saturated with water for 24 h before the columns were exposed to the PCW. Thus, the precipitation reaction also governs P adsorption in the column leaching study. However, exhaustion of the soluble Fe supply occurred at the faster rate than in the batch equilibration study, which along with competition from competing anions limited P adsorption.

The data suggest that there was electrostatic repulsion between P anions and the negatively charged surfaces of magnetite/maghemite at the operating pH, which is consistent with other studies (Shahid et al., "Magnetite Synthesis Using Iron Oxide Waste and Its Application for Phosphate Adsorption with Column and Batch Reactors," *Chem. Eng. Res. Des.* 148:169-179 (2019), which is hereby incorporated by reference in its entirety). So, there is an inherent effect of system pH on the surface charge of Fe oxides which influences P adsorption (Huang et al., "The Maximum of Phosphate Adsorption at PH 4.0: Why It Appears on Aluminum Oxides but Not on Iron Oxides," Langmuir 25:4450-4461 (2009), which is hereby incorporated by reference in its entirety). The equilibrium pH in the tested experimental conditions was greater than or similar to the $pH_{ZPC}$ of magnetite/maghemite but less than the $pH_{ZPC}$ of hematite. This is an important consideration for the P adsorption in this study as the P adsorption occurred onto the hematite (and/or ferrihydrite) surfaces. Although magnetite/maghemite were present as supported by the XRD analysis, these phases appear to have contributed little to P adsorption. Under acidic conditions, however, magnetite and maghemite may contribute more to the adsorption of P.

The P adsorption onto Fe oxides surfaces involves mainly the inner-sphere ligand exchange mechanism, of which different surface area coverages favor mono or bidentate and mono or binuclear complex formation (Sparks, D. L., "Sorption Phenomena on Soils," *Environmental Soil Chemistry*, Elsevier Science (USA), San Diego, CA. 133-186 (2003), which is hereby incorporated by reference in its entirety). Depending on pH and surface coverage, most P complexes on Fe oxides are monodentate and the release of P from monodentate complexes is easier than the release of P from bidentate complexes (Elzinga, E. J. and Sparks, D. L., "Phosphate Adsorption onto Hematite: An in Situ ATR-FTIR Investigation of the Effects of pH and Loading Level on the Mode of Phosphate Surface Complexation," *J. Colloid Interface Sci.* 308(1):53-70 (2007), which is hereby incorporated by reference in its entirety). The SEM-EDS data of post-adsorption ISIB shows that P is associated with Fe mineral phases with a 2:1 stoichiometry. Based on the experimental results, these findings are fully consistent with the present study. The P adsorption capacities for hematite has been reported as 0.19-3.33 $\mu mol/m^2$ due to the large number of open crystal facets and their differences (Barron et al., "Phosphate Adsorption by Aluminous Hematites of Different Shapes," *Soil Sci. Soc. Am. J.* 52:647-651 (1988), which is hereby incorporated by reference in its entirety). Therefore, the high P adsorption capacity of the studied biochar is due to the presence of hematite and to solid state and/or dissolution/precipitation reactions that degraded the hematite during the batch equilibrium and column leaching studies. These reactions also explain different P adsorption capacities of ISIB observed during the column leaching study when samples were challenged with low and high PCW.

The desorption studies were done with two desorbing agents, water and M-III. The amount of P desorbed due to the water can be described as 'easily available P' and P desorption occurs from non-specific adsorption sites or weakly bound P (Doula, M. K. and Ioannou, A., "The Effect of Electrolyte Anion on Cu Adsorption-Desorption by Clinoptilolite," *Microporous Mesoporous Mater.* 58(2):115-

130 (2003), which is hereby incorporated by reference in its entirety). Similarly, M-III extractable P can be described as 'potentially plant available P'. The M-III extracts weakly adsorbed P from non-specific adsorption sites and some but not all tightly bound P from specific adsorption sites. An increase in P desorption was found with an increase in initial P concentration, which suggests an increase in P retained by non-specific adsorption on the ISIB for higher P loadings.

P desorption from the ISIB was several times higher with M-III than with water, whereas there was only a small difference in P desorption between water and M-III for the CS-control biochars. These findings suggest that the P adsorption by the ISIB is mainly specific whereas non-specific adsorption is predominant for the CS-control biochars. Also, for the ISIB, the ratio of M-III and water extractable P decreased with increased in P loading, again suggesting an increase in non-specific P adsorption at high P loadings. The M-III solution contains a chelating agent, EDTA (ethylenediaminetetraacetic acid), which promotes dissolution of the Fe oxide mineral surface sites and releases P into the solution (Johnson, S. E. and Loeppert, R. H., "Role of Organic Acids in Phosphate Mobilization from Iron Oxide," *Soil Sci. Soc. Am. J* 70:222-234 (2006), which is hereby incorporated by reference in its entirety). The P adsorption onto the CS-control biochar was controlled primarily by the anion exchange mechanism of P ions with other anions (mainly carbonates and bi-carbonates) and are mostly reversible; whereas P adsorption by ISIB was dominated by the ligand exchange mechanism leading to P—Fe coordination complexes within previously existing hemitite particles and/or the precipitation of new P—Fe-oxy(hydroxide) phases. Such specific adsorption is only partly reversible.

Economic Analysis

Previous studies at Iowa State University have shown that biochar production is profitable as part of a fast pyrolysis biorefinery. Techno-economic analyses of fast pyrolysis biorefineries have estimated positive net present value while assuming a value for biochar of only $50-$100 per metric ton (Wright et al., "Techno-Economic Analysis of Biomass Fast Pyrolysis to Transportation Fuels," *Fuel* 89(1):S2-S10 (2010); Ganguly et al., "Application of Hydroprocessing, Fermentation, and Anaerobic Digestion in a Carbon-Negative Pyrolysis Refinery," *ACS Sust. Chem. Eng.* 8(44):16413-16421 (2020); Li et al., "Regional Techno-economic and Life-cycle Analysis of the Pyrolysis-bioenergy-biochar Platform for Carbon-negative Energy," *Biofuels, Bioprod. Bioref* 13(6):1428-1438 (2019), which are hereby incorporated by reference in their entirety). While economic analyses have not yet been completed on the process to produce the ISIB biochar for slow-release fertilizer, autothermal pyrolysis simplifies the reactor design and reduces energy input requirements, thus reducing capital and operating expenses (Polin et al., "Process Intensification of Biomass Fast Pyrolysis through Autothermal Operation of a Fluidized Bed Reactor," *Appl. Energy* 249:276-285 (2019), which is hereby incorporated by reference in their entirety). Additionally, the method by which the biomass is pretreated has been evaluated using other pretreatments, most notably sulfuric acid. This process does not add significant operational complexity or cost to a pyrolysis biorefinery (Dalluge et al., "Continuous Production of Sugars from Pyrolysis of Acid-Infused Lignocellulosic Biomass," *Green Chem.* 16:4144-4155 (2014), which is hereby incorporated by reference in its entirety).

CONCLUSIONS AND ENVIRONMENTAL IMPLICATIONS

The high adsorption and low desorption capacity of P by the studied ISIB suggest that this biochar can be used as an effective adsorbent to remove P from aqueous solutions including livestock manure, industrial and municipal wastes, and agricultural effluents and can potentially be used as a slow-release P fertilizer. The M-III desorption of P from the P loaded ISIB were 13,658 and 11,863 mg $kg^{-1}$ of biochar for non-PPAO and PPAO ISIB, respectively, which are equivalent to 4,454 and 3,868 mg elemental phosphorus per kg of biochar. At biochar application rates of 1% in soil (10 tons/acre), the phosphorus release rates for ISIB are 44.54 and 38.68 mg $kg^{-1}$ soil and 4.67 and 8.4 mg $kg^{-1}$ soil for the CS-control biochars. The recommended level of phosphorus in typical US Midwestern agricultural soils is approximately 22 mg $kg^{-1}$ of soil. The P-loaded biochar can then be applied to agricultural lands, where the P is released at rates that allow for high usage by crop plants while reducing nutrient leaching and/or runoff. Alternatively, fresh ISIB could be purposely treated with P solutions to saturate the biochar with P and then directly marketed as a slow-release P fertilizer. Also, results suggest that at application rates of less than or equal to six tons of $FeSO_4$ treated corn stover biochar per acre, the P release rate will meet the recommended inorganic fertilizer application rates of 22 mg P $kg^{-1}$ of soil. This approach facilitates the recycling of P into the soil even when recovering P from effluents with lower, more environmentally relevant concentrations of ≤400 mg/L. Findings from this study can be used to engineer biochar for the environment-friendly strategies to recycle P from wastewater and agriculture, reduce eutrophication and harmful algal blooms in water bodies, promote carbon sequestration and enhance soil quality and sustainable agriculture.

Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed:

1. A method of producing a biochar, said method comprising:
   providing biomass;
   treating the biomass with an iron (II) ion solution;
   pyrolyzing the iron (II)-treated biomass in an oxidative environment;
   recovering a biochar product from the pyrolyzed iron (II)-treated biomass; and
   adsorbing a phosphate anion on the biochar product.

2. The method of claim 1, wherein the iron (II) ion solution is selected from the group consisting of solutions of ferrous sulfate, ferrous acetate, ferrous chloride, and combinations thereof.

3. The method of claim 2, wherein the iron (II) ion solution is an aqueous ferrous sulfate solution.

4. The method of claim 3, wherein the aqueous ferrous sulfate solution is a 1 wt % to 15 wt % ferrous sulfate solution.

5. The method of claim 4, wherein the aqueous solution of ferrous sulfate solution is a 5 wt % to 10 wt % ferrous sulfate solution.

6. The method of claim 1, wherein the biomass is lignocellulosic biomass.

7. The method of claim 6, wherein the lignocellulosic biomass is selected from the group consisting of herbaceous material, agricultural residues, forestry residues, municipal solid wastes, waste paper, pulp, paper mill residues, and combinations thereof.

8. The method of claim 7, wherein the lignocellulosic biomass is selected from the group consisting of corn stover, straw, bagasse, *miscanthus*, sorghum residue, switch grass, bamboo, water hyacinth, hardwood, hardwood chips, softwood chips, hardwood pulp, softwood pulp, and combinations thereof.

9. The method of claim 1 further comprising:
subjecting the biochar product to post pyrolysis oxidation to form an oxidized biochar product.

10. The method of claim 9, wherein the oxidized biochar product has a ratio of hydrogen to carbon content lower than 0.25.

11. The method of claim 1, wherein said adsorbing an anion on the biochar product comprises:
contacting the biochar product with a solution selected from the group consisting of potassium dihydrogen phosphate, potassium hydrogen phosphate, monosodium phosphate, disodium hydrogen phosphate, dicalcium phosphate, monocalcium phosphate, ammonium dihydrogen phosphate, diammonium phosphate, monomagnesium phosphate, dimagnesium phosphate, and combinations thereof.

12. The method of claim 11, wherein the contacting is carried out for a period of time ranging from 24 hours to 48 hours.

13. The method of claim 1, wherein said pyrolyzing is carried out at a temperature ranging from 475° C. to 575° C.

14. The method of claim 13, wherein said pyrolyzing is carried out for a period of time ranging from 0.1 sec to 120 sec.

15. The method of claim 1, wherein said treating is carried out at a temperature ranging from 18° C. to 28° C.

16. The method of claim 1, wherein the concentration of the phosphate adhered to the biochar is 2 to 3 times greater than that achieved when the biochar is produced by non-oxidative pyrolysis of the biomass.

17. The method of claim 1, wherein said pyrolyzing is carried out by autothermal fast pyrolysis.

18. The method of claim 1, wherein the biochar has a ratio of iron (III) to iron (II) ranging from 5:1 to 10:1.

* * * * *